United States Patent
Das et al.

(10) Patent No.: US 9,661,519 B2
(45) Date of Patent: May 23, 2017

(54) EFFICIENT REPORTING OF INFORMATION IN A WIRELESS COMMUNICATION SYSTEM

(75) Inventors: Arnab Das, Summit, NJ (US);
Sundeep Rangan, Jersey City, NJ (US);
Pablo Anigstein, Gillette, NJ (US);
Junyi Li, Bedminster, NJ (US);
Sathyadev Venkata Uppala, Whitehouse Station, NJ (US); Rajiv Laroia, Far Hills, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 836 days.

(21) Appl. No.: 11/486,601

(22) Filed: Jul. 14, 2006

(65) Prior Publication Data

US 2007/0168326 A1    Jul. 19, 2007
US 2010/0211540 A9    Aug. 19, 2010

Related U.S. Application Data

(63) Continuation-in-part of application No. 10/648,766, filed on Aug. 25, 2003, now Pat. No. 7,218,948.

(Continued)

(51) Int. Cl.
*H04W 24/10* (2009.01)
*H04L 1/00* (2006.01)
*H04W 24/00* (2009.01)

(52) U.S. Cl.
CPC ........... *H04W 24/10* (2013.01); *H04L 1/0006* (2013.01); *H04L 1/0026* (2013.01); *H04W 24/00* (2013.01)

(58) Field of Classification Search
CPC ......... G06F 17/30; H04W 4/00; H04W 24/02; H04W 72/08; H04W 72/082; H04W 84/045; H04B 7/00

(Continued)

(56) References Cited

U.S. PATENT DOCUMENTS 4,631,720 A    12/1986   Koeck
4,660,196 A    4/1987    Gray et al.

(Continued)

FOREIGN PATENT DOCUMENTS

CL    3603-2006    12/2006
CL    3604-2006    12/2006

(Continued)

OTHER PUBLICATIONS

Hosein, et al., "Optimal Assignment of Mobile Station Serving Sector for the Forward Link of a Time-Shared Wireless Packet Data Channel." Fifth IEE International Conference on 3G Mobile Communication Technologies (3G 2004). Oct. 18-Oct. 20, 2004, pp. 654-658.

(Continued)

*Primary Examiner* — Mehmood B Khan
(74) *Attorney, Agent, or Firm* — Ashish L. Patel

(57) ABSTRACT

Techniques for efficiently sending reports in a wireless communication system are described. Reports may be sent repetitively in accordance with a reporting format. A terminal receives an assignment of a control channel used to send reports and determines a reporting format to use based on the assignment. The reporting format indicates a specific sequence of reports sent in specific locations of a control channel frame. The terminal generates a set of reports for each reporting interval and arranges the set of reports in accordance with the reporting format. The terminal repetitively sends a plurality of sets of reports in a plurality of reporting intervals. Reports may also be sent adaptively based on operating conditions. An appropriate reporting format may be selected based on the operating conditions of the terminal, which may be characterized by environment (e.g., mobility), capabilities, QoS, and/or other factors.

13 Claims, 13 Drawing Sheets

Related U.S. Application Data

(60) Provisional application No. 60/449,729, filed on Feb. 24, 2003, provisional application No. 60/752,973, filed on Dec. 22, 2005.

(58) Field of Classification Search
USPC .................. 370/347; 455/67.11, 127.5, 574, 455/343.1–343.6; 707/2
See application file for complete search history.

(56) References Cited

U.S. PATENT DOCUMENTS

| | | | |
|---|---|---|---|
| 4,679,244 A | 7/1987 | Kawasaki et al. | |
| 4,833,701 A | 5/1989 | Comroe et al. | |
| 5,128,938 A | 7/1992 | Borras | |
| 5,203,013 A | 4/1993 | Breeden et al. | |
| 5,387,905 A | 2/1995 | Grube et al. | |
| 5,434,848 A | 7/1995 | Chimento, Jr. et al. | |
| 5,461,645 A | 10/1995 | Ishii | |
| 5,465,389 A | 11/1995 | Agrawal et al. | |
| 5,491,837 A | 2/1996 | Haartsen | |
| 5,506,865 A | 4/1996 | Weaver, Jr. | |
| 5,537,414 A | 7/1996 | Takiyasu et al. | |
| 5,579,307 A | 11/1996 | Richetta et al. | |
| 5,732,328 A | 3/1998 | Mitra et al. | |
| 5,835,847 A | 11/1998 | Gilmore et al. | |
| 5,867,478 A | 2/1999 | Baum et al. | |
| 5,898,925 A * | 4/1999 | Honkasalo et al. | 455/437 |
| 5,914,950 A | 6/1999 | Tiedemann et al. | |
| 5,915,221 A | 6/1999 | Sawyer et al. | |
| 5,923,650 A | 7/1999 | Chen et al. | |
| 5,933,421 A | 8/1999 | Alamouti et al. | |
| 5,940,771 A | 8/1999 | Gollnick et al. | |
| 5,966,657 A * | 10/1999 | Sporre | 455/425 |
| 5,966,662 A | 10/1999 | Murto | |
| 5,978,657 A | 11/1999 | Suzuki | |
| 5,999,534 A | 12/1999 | Kim | |
| 6,002,676 A | 12/1999 | Fleming | |
| 6,004,276 A | 12/1999 | Wright et al. | |
| 6,026,081 A | 2/2000 | Hamabe et al. | |
| 6,028,842 A | 2/2000 | Chapman et al. | |
| 6,028,843 A | 2/2000 | Delp et al. | |
| 6,035,000 A | 3/2000 | Bingham et al. | |
| 6,069,871 A | 5/2000 | Sharma et al. | |
| 6,070,072 A | 5/2000 | Dorenbosch et al. | |
| 6,073,025 A | 6/2000 | Chheda et al. | |
| 6,075,285 A | 6/2000 | Bishop et al. | |
| 6,122,270 A | 9/2000 | Whinnett et al. | |
| 6,128,506 A | 10/2000 | Knutsson et al. | |
| 6,131,016 A | 10/2000 | Greenstein et al. | |
| 6,141,565 A | 10/2000 | Feuerstein et al. | |
| 6,169,896 B1 | 1/2001 | Sant et al. | |
| 6,173,005 B1 | 1/2001 | Kotzin et al. | |
| 6,181,948 B1 | 1/2001 | Kondo | |
| 6,201,793 B1 | 3/2001 | Chen et al. | |
| 6,205,129 B1 | 3/2001 | Esteves et al. | |
| 6,215,791 B1 | 4/2001 | Kim | |
| 6,236,646 B1 | 5/2001 | Beming et al. | |
| 6,256,478 B1 | 7/2001 | Allen et al. | |
| 6,259,927 B1 | 7/2001 | Butovitsch et al. | |
| 6,263,392 B1 | 7/2001 | McCauley | |
| 6,298,233 B1 | 10/2001 | Souissi et al. | |
| 6,308,080 B1 | 10/2001 | Burt et al. | |
| 6,310,857 B1 | 10/2001 | Duffield et al. | |
| 6,311,065 B1 | 10/2001 | Ushiki et al. | |
| 6,374,085 B1 | 4/2002 | Saints et al. | |
| 6,377,583 B1 | 4/2002 | Lyles et al. | |
| 6,377,955 B1 * | 4/2002 | Hartmann et al. | |
| 6,405,047 B1 | 6/2002 | Moon | |
| 6,414,946 B1 | 7/2002 | Satou et al. | |
| 6,445,917 B1 * | 9/2002 | Bark et al. | 455/423 |
| 6,453,151 B1 | 9/2002 | Kiang et al. | |
| 6,493,539 B1 | 12/2002 | Falco et al. | |
| 6,526,281 B1 | 2/2003 | Gorsuch et al. | |
| 6,538,986 B2 | 3/2003 | Isaksson et al. | |
| 6,545,999 B1 | 4/2003 | Sugita | |
| 6,553,336 B1 | 4/2003 | Johnson et al. | |
| 6,590,890 B1 | 7/2003 | Stolyar et al. | |
| 6,597,914 B1 | 7/2003 | Silventoinen et al. | |
| 6,600,903 B1 | 7/2003 | Lilja et al. | |
| 6,609,007 B1 | 8/2003 | Eibling et al. | |
| 6,621,808 B1 | 9/2003 | Sadri | |
| 6,625,133 B1 | 9/2003 | Balachandran et al. | |
| 6,662,024 B2 | 12/2003 | Walton et al. | |
| 6,671,512 B2 | 12/2003 | Laakso et al. | |
| 6,680,909 B1 | 1/2004 | Bansal et al. | |
| 6,697,417 B2 | 2/2004 | Fernandez-Corbaton et al. | |
| 6,710,651 B2 | 3/2004 | Forrester | |
| 6,742,020 B1 | 5/2004 | Dimitroff et al. | |
| 6,745,003 B1 | 6/2004 | Maca et al. | |
| 6,745,044 B1 | 6/2004 | Holtzman et al. | |
| 6,751,187 B2 | 6/2004 | Walton et al. | |
| 6,771,934 B2 | 8/2004 | Demers et al. | |
| 6,788,963 B2 | 9/2004 | Laroia et al. | |
| 6,798,761 B2 | 9/2004 | Cain et al. | |
| 6,804,289 B2 | 10/2004 | Takahashi | |
| 6,804,521 B2 | 10/2004 | Tong et al. | |
| 6,807,428 B2 | 10/2004 | Casaccia | |
| 6,816,476 B2 | 11/2004 | Kim et al. | |
| 6,836,673 B1 | 12/2004 | Trott | |
| 6,865,168 B1 | 3/2005 | Sekine | |
| 6,889,056 B2 | 5/2005 | Shibutani | |
| 6,889,257 B1 | 5/2005 | Patel | |
| 6,892,071 B2 | 5/2005 | Park et al. | |
| 6,895,005 B1 | 5/2005 | Malin et al. | |
| 6,895,364 B2 | 5/2005 | Banfer | |
| 6,901,268 B2 | 5/2005 | Chang et al. | |
| 6,901,270 B1 | 5/2005 | Beach | |
| 6,904,016 B2 | 6/2005 | Kuo et al. | |
| 6,904,290 B1 * | 6/2005 | Palenius | H04W 52/267 455/422.1 |
| 6,912,405 B2 | 6/2005 | Hiramatsu et al. | |
| 6,917,607 B1 | 7/2005 | Yeom et al. | |
| 6,940,827 B2 | 9/2005 | Li et al. | |
| 6,957,072 B2 | 10/2005 | Kangras et al. | |
| 6,967,937 B1 * | 11/2005 | Gormley | 370/330 |
| 6,968,156 B2 | 11/2005 | Sugaya et al. | |
| 7,006,841 B2 | 2/2006 | Monogioudis et al. | |
| 7,024,460 B2 | 4/2006 | Koopmas et al. | |
| 7,027,782 B2 | 4/2006 | Moon et al. | |
| 7,031,983 B2 | 4/2006 | Israni et al. | |
| 7,034,254 B2 | 4/2006 | Grabowski et al. | |
| 7,039,029 B2 | 5/2006 | Lee et al. | |
| 7,043,254 B2 | 5/2006 | Chawla et al. | |
| 7,047,009 B2 | 5/2006 | Laroia et al. | |
| 7,054,643 B2 | 5/2006 | Trossen et al. | |
| 7,061,885 B2 | 6/2006 | Kurtz | |
| 7,092,672 B1 * | 8/2006 | Pekonen | H04B 17/309 455/422.1 |
| 7,120,123 B1 | 10/2006 | Quigley et al. | |
| 7,120,448 B2 | 10/2006 | Brouwer et al. | |
| 7,123,910 B2 | 10/2006 | Lucidarme et al. | |
| 7,139,536 B2 | 11/2006 | Chiu | |
| 7,142,548 B2 | 11/2006 | Fong et al. | |
| 7,146,172 B2 | 12/2006 | Li et al. | |
| 7,158,796 B2 | 1/2007 | Tiedemann, Jr. et al. | |
| 7,161,909 B2 | 1/2007 | Sharma | |
| 7,162,203 B1 | 1/2007 | Brunner et al. | |
| 7,197,025 B2 | 3/2007 | Chuah | |
| 7,203,493 B2 | 4/2007 | Fujii et al. | |
| 7,212,821 B2 | 5/2007 | Laroia et al. | |
| 7,218,948 B2 | 5/2007 | Laroia et al. | |
| 7,245,935 B2 | 7/2007 | Lin | |
| 7,260,054 B2 | 8/2007 | Olszewski et al. | |
| 7,269,406 B2 | 9/2007 | Qi | |
| 7,277,709 B2 | 10/2007 | Vadgama | |
| 7,277,737 B1 | 10/2007 | Vollmer et al. | |
| 7,280,814 B2 | 10/2007 | Austin et al. | |
| 7,283,836 B2 | 10/2007 | Hwang et al. | |
| 7,299,277 B1 | 11/2007 | Moran et al. | |
| 7,317,921 B2 | 1/2008 | Mueckenheim et al. | |
| 7,319,680 B2 | 1/2008 | Cho | |
| 7,321,563 B2 | 1/2008 | Kim et al. | |
| 7,340,267 B2 | 3/2008 | Budka et al. | |

(56) References Cited

U.S. PATENT DOCUMENTS

| | | |
|---|---|---|
| 7,349,667 B2 | 3/2008 | Magee et al. |
| 7,356,635 B2 | 4/2008 | Woodings et al. |
| 7,362,702 B2 | 4/2008 | Terrell et al. |
| 7,382,755 B2 | 6/2008 | Dugad et al. |
| 7,395,058 B1 | 7/2008 | Kalofonos et al. |
| 7,397,803 B2 | 7/2008 | Love et al. |
| 7,400,901 B2 | 7/2008 | Kostic et al. |
| 7,412,265 B2 | 8/2008 | Chen et al. |
| 7,418,260 B2 | 8/2008 | Lucidarme |
| 7,420,939 B2 | 9/2008 | Laroia et al. |
| 7,430,206 B2 | 9/2008 | Terry et al. |
| 7,430,207 B2 | 9/2008 | Wu et al. |
| 7,430,420 B2 | 9/2008 | Derakhshan et al. |
| 7,447,148 B2 | 11/2008 | Gao et al. |
| 7,463,577 B2 | 12/2008 | Sudo et al. |
| 7,486,620 B2 | 2/2009 | Seol |
| 7,486,638 B2 | 2/2009 | Ofuji et al. |
| 7,502,614 B2 | 3/2009 | Uchida et al. |
| 7,508,792 B2 | 3/2009 | Petrovic et al. |
| 7,510,828 B2 | 3/2009 | Lynn et al. |
| 7,512,076 B2 | 3/2009 | Kwon et al. |
| 7,512,185 B2 | 3/2009 | Sharon et al. |
| 7,519,013 B2 | 4/2009 | Destino et al. |
| 7,519,033 B2 | 4/2009 | Soomro |
| 7,522,544 B2 | 4/2009 | Cheng et al. |
| 7,525,971 B2 | 4/2009 | Carroll et al. |
| 7,526,091 B2 | 4/2009 | Jeong et al. |
| 7,558,572 B2 | 7/2009 | Anigstein |
| 7,561,893 B2 | 7/2009 | Moulsley et al. |
| 7,668,573 B2 | 2/2010 | Laroia et al. |
| 7,743,284 B1 | 6/2010 | Taylor et al. |
| 7,986,660 B2 * | 7/2011 | Ramos ............ H04W 16/14 370/329 |
| 7,986,672 B2 | 7/2011 | Tiedemann, Jr. et al. |
| 8,005,454 B1 * | 8/2011 | Lavelle ............ H04W 52/028 345/163 |
| 8,040,831 B2 | 10/2011 | Kurtz et al. |
| 8,190,163 B2 | 5/2012 | Laroia et al. |
| 8,233,462 B2 | 7/2012 | Walton et al. |
| RE43,593 E | 8/2012 | Kayama et al. |
| 8,284,752 B2 | 10/2012 | Ketchum et al. |
| 8,325,621 B2 | 12/2012 | Simonsson et al. |
| 8,437,251 B2 | 5/2013 | Das et al. |
| 8,503,938 B2 | 8/2013 | Laroia et al. |
| 8,560,026 B2 * | 10/2013 | Chanterac ........ H04W 52/0245 370/250 |
| 2001/0007552 A1 | 7/2001 | Schiff et al. |
| 2001/0036181 A1 | 11/2001 | Rogers |
| 2001/0046878 A1 | 11/2001 | Chang et al. |
| 2001/0055293 A1 | 12/2001 | Parsa et al. |
| 2002/0012326 A1 | 1/2002 | Chang et al. |
| 2002/0031105 A1 | 3/2002 | Zeira et al. |
| 2002/0037729 A1 | 3/2002 | Kitazawa et al. |
| 2002/0045448 A1 | 4/2002 | Park et al. |
| 2002/0049040 A1 | 4/2002 | Sugaya et al. |
| 2002/0075835 A1 | 6/2002 | Krishnakumar et al. |
| 2002/0077140 A1 | 6/2002 | Monogioudis et al. |
| 2002/0077141 A1 * | 6/2002 | Hwang ............ H04W 52/143 455/522 |
| 2002/0080967 A1 * | 6/2002 | Abdo .............. G06F 21/85 380/270 |
| 2002/0082011 A1 | 6/2002 | Fujii et al. |
| 2002/0085516 A1 | 7/2002 | Bridgelall |
| 2002/0093953 A1 | 7/2002 | Naim et al. |
| 2002/0107028 A1 | 8/2002 | Rantalainen et al. |
| 2002/0122431 A1 * | 9/2002 | Cho et al. ............ 370/465 |
| 2002/0136195 A1 | 9/2002 | Kurtz et al. |
| 2002/0142788 A1 | 10/2002 | Chawla et al. |
| 2002/0143858 A1 | 10/2002 | Teague et al. |
| 2002/0147017 A1 | 10/2002 | Li et al. |
| 2002/0177452 A1 | 11/2002 | Ruutu et al. |
| 2002/0186678 A1 | 12/2002 | Averbuch et al. |
| 2002/0188723 A1 * | 12/2002 | Choi ............... H04W 36/06 709/225 |
| 2003/0003921 A1 | 1/2003 | Laakso et al. |
| 2003/0007498 A1 | 1/2003 | Angle et al. |
| 2003/0012212 A1 | 1/2003 | Earnshaw et al. |
| 2003/0016641 A1 | 1/2003 | Terry et al. |
| 2003/0023412 A1 * | 1/2003 | Rappaport et al. ............ 703/1 |
| 2003/0027587 A1 | 2/2003 | Proctor, Jr. |
| 2003/0032463 A1 * | 2/2003 | Cannon ........... H04W 52/0229 455/574 |
| 2003/0050012 A1 * | 3/2003 | Black ............... H04W 72/02 455/62 |
| 2003/0063587 A1 * | 4/2003 | Cho ............... H04L 1/0025 370/335 |
| 2003/0064737 A1 | 4/2003 | Eriksson et al. |
| 2003/0078067 A1 | 4/2003 | Kim et al. |
| 2003/0095519 A1 | 5/2003 | Kuo et al. |
| 2003/0100269 A1 | 5/2003 | Lehtinen et al. |
| 2003/0114180 A1 | 6/2003 | Black et al. |
| 2003/0123396 A1 * | 7/2003 | Seo et al. ............ 370/252 |
| 2003/0123410 A1 | 7/2003 | Youm |
| 2003/0123559 A1 * | 7/2003 | Classon ........... H04L 1/0026 375/260 |
| 2003/0139197 A1 | 7/2003 | Kostic et al. |
| 2003/0144042 A1 * | 7/2003 | Weinfield et al. ............ 455/574 |
| 2003/0157899 A1 | 8/2003 | Trossen et al. |
| 2003/0161285 A1 * | 8/2003 | Tiedemann, Jr. ..... H04B 17/309 370/332 |
| 2003/0169705 A1 | 9/2003 | Knisely et al. |
| 2003/0185224 A1 | 10/2003 | Ramanan et al. |
| 2003/0185285 A1 | 10/2003 | Talwar |
| 2003/0193915 A1 | 10/2003 | Lee et al. |
| 2003/0198204 A1 | 10/2003 | Taneja et al. |
| 2003/0198206 A1 * | 10/2003 | Cain et al. ............ 370/337 |
| 2003/0202563 A1 * | 10/2003 | Das ............... H04B 1/707 375/146 |
| 2003/0206541 A1 | 11/2003 | Yun et al. |
| 2003/0207691 A1 | 11/2003 | Chen |
| 2003/0207693 A1 | 11/2003 | Roderique |
| 2003/0214906 A1 | 11/2003 | Hu et al. |
| 2003/0214928 A1 | 11/2003 | Chuah et al. |
| 2003/0223354 A1 | 12/2003 | Olszewski et al. |
| 2004/0001429 A1 | 1/2004 | Ma et al. |
| 2004/0004954 A1 | 1/2004 | Terry et al. |
| 2004/0013103 A1 | 1/2004 | Zhang et al. |
| 2004/0057402 A1 | 3/2004 | Ramos et al. |
| 2004/0062206 A1 | 4/2004 | Soong et al. |
| 2004/0081089 A1 | 4/2004 | Ayyagari |
| 2004/0082344 A1 | 4/2004 | Moilanen et al. |
| 2004/0085936 A1 * | 5/2004 | Gopalakrishnan H04W 72/0413 370/335 |
| 2004/0091026 A1 | 5/2004 | Nakayama |
| 2004/0111640 A1 | 6/2004 | Baum |
| 2004/0120289 A1 * | 6/2004 | Hamalainen ......... H04B 7/2628 370/335 |
| 2004/0120411 A1 | 6/2004 | Walton et al. |
| 2004/0125776 A1 | 7/2004 | Haugli et al. |
| 2004/0127226 A1 * | 7/2004 | Dugad et al. ............ 455/450 |
| 2004/0131007 A1 | 7/2004 | Smee et al. |
| 2004/0141466 A1 | 7/2004 | Kim et al. |
| 2004/0147262 A1 * | 7/2004 | Lescuyer et al. ............ 455/434 |
| 2004/0147276 A1 | 7/2004 | Gholmieh et al. |
| 2004/0160922 A1 | 8/2004 | Nanda et al. |
| 2004/0162097 A1 | 8/2004 | Vijayan et al. |
| 2004/0166869 A1 | 8/2004 | Laroia et al. |
| 2004/0166886 A1 * | 8/2004 | Laroia et al. ............ 455/522 |
| 2004/0166887 A1 | 8/2004 | Laroia et al. |
| 2004/0171401 A1 | 9/2004 | Balachandran et al. |
| 2004/0180658 A1 | 9/2004 | Uchida et al. |
| 2004/0184410 A1 | 9/2004 | Park |
| 2004/0192371 A1 | 9/2004 | Zhao et al. |
| 2004/0196802 A1 | 10/2004 | Bae et al. |
| 2004/0203717 A1 | 10/2004 | Wingrowicz et al. |
| 2004/0203981 A1 | 10/2004 | Budka et al. |
| 2004/0213326 A1 | 10/2004 | Parizhsky et al. |
| 2004/0218617 A1 | 11/2004 | Sagfors |
| 2004/0223455 A1 | 11/2004 | Fong et al. |
| 2004/0224677 A1 | 11/2004 | Kuchibhotla et al. |
| 2004/0228313 A1 | 11/2004 | Cheng et al. |
| 2004/0233838 A1 | 11/2004 | Sudo et al. |

(56) References Cited

U.S. PATENT DOCUMENTS

| | | |
|---|---|---|
| 2004/0235510 A1 | 11/2004 | Elicegui et al. |
| 2004/0248518 A1 | 12/2004 | Kashiwase et al. |
| 2004/0248568 A1 | 12/2004 | Lucidarme et al. |
| 2004/0252647 A1 | 12/2004 | Chang et al. |
| 2004/0252662 A1 | 12/2004 | Cho et al. |
| 2004/0253996 A1 | 12/2004 | Chen et al. |
| 2004/0258040 A1 | 12/2004 | Joshi et al. |
| 2004/0259546 A1 | 12/2004 | Balachandran et al. |
| 2004/0264414 A1 | 12/2004 | Dorenbosch |
| 2004/0266474 A1 | 12/2004 | Petrus et al. |
| 2005/0003768 A1* | 1/2005 | Laroia ............... H04B 7/0626 455/101 |
| 2005/0003847 A1 | 1/2005 | Love et al. |
| 2005/0008892 A1 | 1/2005 | Yamamoto et al. |
| 2005/0037775 A1 | 2/2005 | Moeglein et al. |
| 2005/0047344 A1 | 3/2005 | Seol et al. |
| 2005/0047393 A1 | 3/2005 | Liu et al. |
| 2005/0047416 A1 | 3/2005 | Heo et al. |
| 2005/0053099 A1 | 3/2005 | Spear et al. |
| 2005/0058637 A1 | 3/2005 | Lynn et al. |
| 2005/0064821 A1 | 3/2005 | Hedberg et al. |
| 2005/0068922 A1 | 3/2005 | Jalali |
| 2005/0085197 A1 | 4/2005 | Laroia et al. |
| 2005/0099987 A1 | 5/2005 | Lester et al. |
| 2005/0111361 A1 | 5/2005 | Hosein |
| 2005/0111462 A1 | 5/2005 | Walton et al. |
| 2005/0118981 A1* | 6/2005 | Laroia ............... H04W 16/12 455/343.3 |
| 2005/0118993 A1 | 6/2005 | Roux et al. |
| 2005/0122900 A1 | 6/2005 | Tuulos et al. |
| 2005/0128999 A1 | 6/2005 | Kwon et al. |
| 2005/0135320 A1 | 6/2005 | Tiedemann, Jr. et al. |
| 2005/0136937 A1 | 6/2005 | Qian et al. |
| 2005/0143084 A1 | 6/2005 | Cheng et al. |
| 2005/0143114 A1 | 6/2005 | Moulsley et al. |
| 2005/0152320 A1 | 7/2005 | Marinier et al. |
| 2005/0157803 A1 | 7/2005 | Kim et al. |
| 2005/0157876 A1 | 7/2005 | Jeong et al. |
| 2005/0170782 A1 | 8/2005 | Rong et al. |
| 2005/0181732 A1 | 8/2005 | Kang et al. |
| 2005/0181799 A1* | 8/2005 | Laroia ............... H04B 17/24 455/450 |
| 2005/0185632 A1 | 8/2005 | Draves, Jr. et al. |
| 2005/0195765 A1 | 9/2005 | Sharon et al. |
| 2005/0201331 A1 | 9/2005 | Gaal et al. |
| 2005/0201353 A1 | 9/2005 | Lee et al. |
| 2005/0207335 A1 | 9/2005 | Schmidl et al. |
| 2005/0207359 A1 | 9/2005 | Hwang et al. |
| 2005/0207373 A1 | 9/2005 | Roy et al. |
| 2005/0220052 A1 | 10/2005 | Uehara et al. |
| 2005/0232154 A1 | 10/2005 | Bang et al. |
| 2005/0243938 A1 | 11/2005 | Armstrong et al. |
| 2005/0249118 A1 | 11/2005 | Terry et al. |
| 2005/0250509 A1 | 11/2005 | Choksi et al. |
| 2005/0250510 A1 | 11/2005 | Kaikkonen et al. |
| 2005/0250529 A1 | 11/2005 | Funnell et al. |
| 2005/0255873 A1 | 11/2005 | Zhang et al. |
| 2005/0259662 A1 | 11/2005 | Kim et al. |
| 2005/0265301 A1 | 12/2005 | Heo et al. |
| 2005/0281232 A1 | 12/2005 | Kim et al. |
| 2005/0281278 A1 | 12/2005 | Black et al. |
| 2005/0289256 A1 | 12/2005 | Cudak et al. |
| 2006/0003767 A1 | 1/2006 | Kim et al. |
| 2006/0015357 A1 | 1/2006 | Cagan |
| 2006/0018284 A1 | 1/2006 | Rudolf et al. |
| 2006/0019694 A1 | 1/2006 | Sutivong et al. |
| 2006/0025160 A1* | 2/2006 | Kodali ............... H04W 60/04 455/456.5 |
| 2006/0034174 A1 | 2/2006 | Nishibayashi et al. |
| 2006/0040696 A1 | 2/2006 | Lin et al. |
| 2006/0045013 A1 | 3/2006 | Vannithamby et al. |
| 2006/0056346 A1 | 3/2006 | Vadgama et al. |
| 2006/0057965 A1* | 3/2006 | Braun ............... H04W 36/30 455/67.11 |
| 2006/0073836 A1 | 4/2006 | Laroia et al. |
| 2006/0079257 A1 | 4/2006 | Iochi et al. |
| 2006/0079267 A1 | 4/2006 | Kim et al. |
| 2006/0083161 A1 | 4/2006 | Laroia et al. |
| 2006/0089104 A1 | 4/2006 | Kaikkonen et al. |
| 2006/0092881 A1 | 5/2006 | Laroia et al. |
| 2006/0094366 A1* | 5/2006 | Cho ............... H04W 72/1278 455/67.11 |
| 2006/0104240 A1 | 5/2006 | Sebire et al. |
| 2006/0120470 A1* | 6/2006 | Hwang ............... H04B 99/00 375/260 |
| 2006/0126497 A1 | 6/2006 | Na et al. |
| 2006/0128410 A1 | 6/2006 | Derryberry et al. |
| 2006/0128412 A1 | 6/2006 | Mantha et al. |
| 2006/0133346 A1 | 6/2006 | Chheda et al. |
| 2006/0133521 A1* | 6/2006 | Sampath ............... H04L 1/0618 375/260 |
| 2006/0135193 A1 | 6/2006 | Ratasuk et al. |
| 2006/0140154 A1 | 6/2006 | Kwak et al. |
| 2006/0142032 A1 | 6/2006 | Derakhshan et al. |
| 2006/0164981 A1 | 7/2006 | Olsson et al. |
| 2006/0165029 A1 | 7/2006 | Melpignano et al. |
| 2006/0176807 A1 | 8/2006 | Wu et al. |
| 2006/0182022 A1 | 8/2006 | Abedi |
| 2006/0203765 A1 | 9/2006 | Laroia et al. |
| 2006/0205356 A1 | 9/2006 | Laroia et al. |
| 2006/0205396 A1 | 9/2006 | Laroia et al. |
| 2006/0215604 A1 | 9/2006 | Mueckenheim et al. |
| 2006/0234722 A1 | 10/2006 | Hanebeck et al. |
| 2006/0245452 A1 | 11/2006 | Frederiksen et al. |
| 2006/0246916 A1 | 11/2006 | Cheng et al. |
| 2006/0251156 A1* | 11/2006 | Grant ............... H04B 1/7103 375/148 |
| 2006/0256747 A1 | 11/2006 | Jaakkola |
| 2006/0270399 A1 | 11/2006 | Qi et al. |
| 2006/0285481 A1 | 12/2006 | Lane et al. |
| 2006/0287743 A1 | 12/2006 | Sampath et al. |
| 2007/0002757 A1 | 1/2007 | Soomro et al. |
| 2007/0002806 A1 | 1/2007 | Soomro et al. |
| 2007/0004437 A1 | 1/2007 | Harada et al. |
| 2007/0010226 A1 | 1/2007 | Laroia et al. |
| 2007/0015541 A1 | 1/2007 | Dominique et al. |
| 2007/0026803 A1 | 2/2007 | Malm |
| 2007/0026808 A1 | 2/2007 | Love et al. |
| 2007/0026810 A1* | 2/2007 | Love ............... H04B 7/063 455/67.11 |
| 2007/0030828 A1 | 2/2007 | Vimpari et al. |
| 2007/0036116 A1 | 2/2007 | Eiger et al. |
| 2007/0054624 A1 | 3/2007 | Kashiwagi |
| 2007/0057952 A1 | 3/2007 | Swedberg et al. |
| 2007/0066273 A1 | 3/2007 | Laroia et al. |
| 2007/0070894 A1 | 3/2007 | Wang et al. |
| 2007/0081492 A1 | 4/2007 | Petrovic et al. |
| 2007/0081498 A1 | 4/2007 | Niwano |
| 2007/0104128 A1 | 5/2007 | Laroia et al. |
| 2007/0104164 A1 | 5/2007 | Laroia et al. |
| 2007/0109999 A1 | 5/2007 | Brunner |
| 2007/0133412 A1 | 6/2007 | Hutter et al. |
| 2007/0140168 A1 | 6/2007 | Laroia et al. |
| 2007/0140179 A1 | 6/2007 | Zhang et al. |
| 2007/0141994 A1 | 6/2007 | Cheng et al. |
| 2007/0147283 A1 | 6/2007 | Laroia et al. |
| 2007/0147377 A1 | 6/2007 | Laroia et al. |
| 2007/0149126 A1 | 6/2007 | Rangan et al. |
| 2007/0149128 A1 | 6/2007 | Das et al. |
| 2007/0149129 A1 | 6/2007 | Das et al. |
| 2007/0149131 A1 | 6/2007 | Li et al. |
| 2007/0149132 A1 | 6/2007 | Li et al. |
| 2007/0149137 A1 | 6/2007 | Richardson et al. |
| 2007/0149138 A1 | 6/2007 | Das et al. |
| 2007/0149194 A1 | 6/2007 | Das et al. |
| 2007/0149227 A1 | 6/2007 | Parizhsky et al. |
| 2007/0149228 A1 | 6/2007 | Das |
| 2007/0149238 A1 | 6/2007 | Das et al. |
| 2007/0159969 A1 | 7/2007 | Das et al. |
| 2007/0168326 A1 | 7/2007 | Das et al. |
| 2007/0173208 A1 | 7/2007 | Nishio et al. |
| 2007/0177510 A1 | 8/2007 | Natarajan et al. |
| 2007/0183308 A1 | 8/2007 | Korobokov et al. |

(56) References Cited

U.S. PATENT DOCUMENTS

| | | |
|---|---|---|
| 2007/0213087 A1 | 9/2007 | Laroia et al. |
| 2007/0243882 A1 | 10/2007 | Edge |
| 2007/0249287 A1 | 10/2007 | Das et al. |
| 2007/0249360 A1 | 10/2007 | Das et al. |
| 2007/0253355 A1 | 11/2007 | Hande et al. |
| 2007/0253357 A1 | 11/2007 | Das et al. |
| 2007/0253358 A1 | 11/2007 | Das et al. |
| 2007/0253385 A1 | 11/2007 | Li et al. |
| 2007/0253449 A1 | 11/2007 | Das et al. |
| 2007/0254595 A1* | 11/2007 | Yoon ............... H04L 5/0057 455/67.14 |
| 2007/0258365 A1 | 11/2007 | Das et al. |
| 2007/0298728 A1* | 12/2007 | Imamura ............... H04L 5/0046 455/77 |
| 2008/0031368 A1 | 2/2008 | Lindoff et al. |
| 2008/0037474 A1 | 2/2008 | Niwano |
| 2008/0051086 A2 | 2/2008 | Etemad et al. |
| 2008/0057969 A1 | 3/2008 | Agami et al. |
| 2008/0076462 A1 | 3/2008 | Iochi et al. |
| 2008/0144521 A1 | 6/2008 | Soomro et al. |
| 2008/0159235 A1 | 7/2008 | Son et al. |
| 2008/0167047 A1 | 7/2008 | Abedi |
| 2008/0212524 A1 | 9/2008 | Niwano |
| 2009/0004983 A1 | 1/2009 | Darabi |
| 2009/0034455 A1 | 2/2009 | Lee et al. |
| 2009/0103507 A1 | 4/2009 | Gu et al. |
| 2009/0252122 A1 | 10/2009 | Leinonen et al. |
| 2009/0298496 A1* | 12/2009 | Pettersson ............ H04W 36/32 455/434 |
| 2009/0303900 A1 | 12/2009 | Cho et al. |
| 2010/0177731 A1 | 7/2010 | Ananthaiyer et al. |
| 2010/0220626 A1 | 9/2010 | Das et al. |
| 2011/0090812 A1 | 4/2011 | Aoyama |
| 2011/0149789 A1 | 6/2011 | Edge |
| 2012/0140756 A1 | 6/2012 | Rudolf et al. |
| 2013/0230027 A1 | 9/2013 | Das et al. |
| 2013/0242888 A1 | 9/2013 | Das et al. |
| 2015/0043374 A1 | 2/2015 | Hande et al. |
| 2015/0333948 A1 | 11/2015 | Richardson |
| 2015/0334590 A1 | 11/2015 | Das |
| 2016/0255633 A1 | 9/2016 | Parizhsky |

FOREIGN PATENT DOCUMENTS

| | | |
|---|---|---|
| CL | 3605-2006 | 12/2006 |
| CN | 1159262 A | 9/1997 |
| CN | 1159286 A | 9/1997 |
| CN | 1265792 | 9/2000 |
| CN | 1286006 A | 2/2001 |
| CN | 1286821 A | 3/2001 |
| CN | 1286832 A | 3/2001 |
| CN | 1316140 | 10/2001 |
| CN | 1335036 A | 2/2002 |
| CN | 1338877 A | 3/2002 |
| CN | 1338878 A | 3/2002 |
| CN | 1507708 | 6/2004 |
| CN | 1545252 A | 11/2004 |
| CN | 1604685 | 4/2005 |
| CN | 1684457 A | 10/2005 |
| DE | 10162564 | 7/2003 |
| EP | 1037419 A2 | 9/2000 |
| EP | 1037491 | 9/2000 |
| EP | 1 054 518 | 11/2000 |
| EP | 1089500 A2 | 4/2001 |
| EP | 1179962 A2 | 2/2002 |
| EP | 1180881 | 2/2002 |
| EP | 1180907 | 2/2002 |
| EP | 1221273 A1 | 7/2002 |
| EP | 1233637 A1 | 8/2002 |
| EP | 1377100 A2 | 1/2004 |
| EP | 1493284 A1 | 1/2005 |
| EP | 1511245 | 3/2005 |
| EP | 1564953 A2 | 8/2005 |
| EP | 1571762 A1 | 9/2005 |
| EP | 1 594 260 | 11/2005 |
| EP | 1758276 A1 | 2/2007 |
| EP | 1841259 | 10/2007 |
| GB | 2340693 A | 2/2000 |
| JP | 08008806 | 1/1996 |
| JP | 8503591 | 4/1996 |
| JP | 9275582 A | 10/1997 |
| JP | 09307939 | 11/1997 |
| JP | 10022975 A | 1/1998 |
| JP | 10173585 | 6/1998 |
| JP | 11122167 A | 4/1999 |
| JP | 2000049689 A | 2/2000 |
| JP | 2001007761 | 1/2001 |
| JP | 2001016152 | 1/2001 |
| JP | 2001510974 | 8/2001 |
| JP | 2001512921 T | 8/2001 |
| JP | 2001251680 A | 9/2001 |
| JP | 2001523901 T | 11/2001 |
| JP | 2001525135 T | 12/2001 |
| JP | 2002077992 | 3/2002 |
| JP | 2002111627 A | 4/2002 |
| JP | 2002262330 A | 9/2002 |
| JP | 2003018641 A | 1/2003 |
| JP | 2003500911 | 1/2003 |
| JP | 2003509983 A | 3/2003 |
| JP | 2003510887 | 3/2003 |
| JP | 2003520153 A | 7/2003 |
| JP | 2003244161 | 8/2003 |
| JP | 2004153585 | 5/2004 |
| JP | 2004297284 A | 10/2004 |
| JP | 2004533731 | 11/2004 |
| JP | 2004350052 | 12/2004 |
| JP | 2005073276 | 3/2005 |
| JP | 2005130482 | 5/2005 |
| JP | 2005136773 A | 5/2005 |
| JP | 2005142965 A | 6/2005 |
| JP | 2005525730 A | 8/2005 |
| JP | 2005526417 A | 9/2005 |
| JP | 2005333671 | 12/2005 |
| JP | 2006514735 A | 5/2006 |
| JP | 06268574 A | 10/2006 |
| JP | 2006526323 A | 11/2006 |
| JP | 2007503156 A | 2/2007 |
| JP | 2007509531 | 4/2007 |
| JP | 2007514364 A | 5/2007 |
| JP | 2007514378 T | 5/2007 |
| JP | 2007521685 A | 8/2007 |
| JP | 2007522692 A | 8/2007 |
| JP | 2007525044 A | 8/2007 |
| JP | 2007525045 T | 8/2007 |
| JP | 2006518578 A | 3/2011 |
| JP | 2011045054 | 3/2011 |
| JP | 2006524966 T | 5/2011 |
| KR | 1019990084525 | 12/1999 |
| KR | 20010014223 | 2/2001 |
| KR | 20040018526 | 3/2004 |
| KR | 20040053859 A | 6/2004 |
| KR | 20040084599 A | 10/2004 |
| KR | 20040110044 A | 12/2004 |
| KR | 20050021083 | 3/2005 |
| KR | 20050023187 A | 3/2005 |
| KR | 20050039376 A | 4/2005 |
| KR | 1020050099633 | 10/2005 |
| KR | 1020050121274 | 12/2005 |
| KR | 20060012282 A | 2/2006 |
| RU | 2149518 C1 | 5/2000 |
| RU | 2181529 | 4/2002 |
| RU | 2188506 C2 | 8/2002 |
| RU | 2202154 C2 | 4/2003 |
| TW | 200423642 | 11/2004 |
| TW | 200539627 | 12/2005 |
| WO | 9408432 | 4/1994 |
| WO | 9623371 | 8/1996 |
| WO | WO9845967 A2 | 10/1998 |
| WO | WO9856120 A2 | 12/1998 |
| WO | 9907090 A1 | 2/1999 |
| WO | 9909779 A1 | 2/1999 |
| WO | 9913600 A1 | 3/1999 |
| WO | WO9959254 A2 | 11/1999 |

(56) References Cited

FOREIGN PATENT DOCUMENTS

| | | |
|---|---|---|
| WO | 0001188 A1 | 1/2001 |
| WO | WO0101610 A1 | 1/2001 |
| WO | 0122759 A1 | 3/2001 |
| WO | WO01035548 A1 | 5/2001 |
| WO | 0142047 A2 | 6/2001 |
| WO | WO0182504 | 11/2001 |
| WO | 0199291 A2 | 12/2001 |
| WO | WO0232183 A1 | 4/2002 |
| WO | WO0233841 A1 | 4/2002 |
| WO | WO02032183 A1 | 4/2002 |
| WO | WO02033841 A1 | 4/2002 |
| WO | 0239760 A2 | 5/2002 |
| WO | WO0249305 | 6/2002 |
| WO | WO02073831 A1 | 9/2002 |
| WO | 02101941 A2 | 12/2002 |
| WO | WO02104058 A1 | 12/2002 |
| WO | WO03094544 A1 | 11/2003 |
| WO | 03105498 A1 | 12/2003 |
| WO | 2004031918 A2 | 4/2004 |
| WO | 2004077685 | 9/2004 |
| WO | 2004077728 A2 | 9/2004 |
| WO | 2004084503 | 9/2004 |
| WO | 2004084575 A2 | 9/2004 |
| WO | WO2004084452 | 9/2004 |
| WO | 2004098072 A2 | 11/2004 |
| WO | 2004100450 | 11/2004 |
| WO | 2004105420 A1 | 12/2004 |
| WO | 2004110081 | 12/2004 |
| WO | 2005018115 A1 | 2/2005 |
| WO | 2005020490 | 3/2005 |
| WO | 2005034438 | 4/2005 |
| WO | 2005039119 A1 | 4/2005 |
| WO | 2005057812 A1 | 6/2005 |
| WO | 2005060132 | 6/2005 |
| WO | WO2005060271 A1 | 6/2005 |
| WO | WO2005060277 A2 | 6/2005 |
| WO | 2005065056 | 7/2005 |
| WO | WO2005065056 A2 | 7/2005 |
| WO | WO2005069519 | 7/2005 |
| WO | 2005107311 A1 | 11/2005 |
| WO | 2005125049 | 12/2005 |
| WO | WO2006044718 A2 | 4/2006 |
| WO | 2006075293 | 7/2006 |
| WO | 2007031956 | 3/2007 |

OTHER PUBLICATIONS

Kwon, et al., "Quasi-Dedicated Access Scheme for Uplink Realtime Services in Future Wireless Communication Systems," Vehicular Technology Conference, 2005. VTC 2005—Spring. 2005 IEEE 61st Stockholm, Sweden, Apr. 20-May 1, 2005, Piscataway, NJ, USA, May 30, 2005, pp. 3117-3121.
Majmundar, "Impact of Mobile-Originated Short Message Service on the Digital Control Channel of TDMA Systems," Vehicular Technology Conference, 2000. IEEE VTS Fall VTC 2000. 52nd Sep. 24-28, 2000, Piscataway, NJ, USA, IEEE, Sep. 24, 2000, pp. 1550-1555.
International Search Report—PCT/US06/048525, International Search Authority—European Patent Office, Jun. 25, 2008.
Written Opinion—PCT/US06/048525, International Search Authority—European Patent Office, Jun. 25, 2008.
European Search Report—EP10157769—Berlin—Apr. 9, 2010.
IEEE P802.16e/D5: "Draft IEEE Standard for Local and metropolitan area networks, Part 16: Air Interface for Fixed and Mobile Broadband Wireless Access Systems Amendment for Physical and Medium Access Control Layers for Combined Fixed and Mobile Operation in Licensed Bands", pp. 1-356, Sep. 2004
IEEE P802.16e/D5: "Draft IEEE Standard for Local and metropolitan area networks, Part 16: Air Interface for Fixed and Mobile Broadband Wireless Access Systems Amendment for Physical and Medium Access Control Layers for Combined Fixed and Mobile Operation in Licensed Bands", pp. 184-190, Sep. 2004.
Hang Zhang et al, "Clean up for Closed-Loop MIMO in H-ARQ MAP IE", IEEE P802.16e/D7 Broadband Wireless Access Working Group <http://ieee802.org/16>, pp. 1-6, Mar. 10, 2010.
Translation of Office Action in Ukraine application 200508984 corresponding to U.S. Appl. No. 11/748,433, citing US20020160802, WO0232183, RU2181529, WO9845967, EP1377100, U.S. Pat. No. 5,867,478, US20010007552 , U.S. Pat. No. 6,035,000 and U.S. Pat. No. 5,933,421 dated Dec. 9, 2010.
Translation of Office Action in Ukraine Application 2010-10406 corresponding to U.S. Appl. No. 11/748,433, citing U.S. Pat. No. 5,867,478, US20010007552, U.S. Pat. No. 6,035,000 ,U.S. Pat. No. 5,933,421 ,WO02073831 ,WO02032183 ,RU2181529 and EP1377100 dated Feb. 22, 2011.
3GPP: ETSI TS 125 331 V6.3.0: Radio Resource Control (RRC) protocol specification (3GPP TS 25.331 version 6.3.0 Release 6), Sep. 1, 2004, pp. 49, 202-209, 220,221,406,579-585, 589, 930.
3GPP TSG RAN2#45bis. "EDCH Buffer Status Reporting," R2-050026, Sophia Antipolis, France, Jan. 10-14, 2005, URL: http://www.3gpp.org/ftp/tsg_ran/WG2_RL2/TSGR2_45bis/Dcs/R2-050026.zip.
3GPP TSG-RAN WG2 meeting #48. "Scheduling Information Contents," R2-051957, London, United Kingdom, Aug. 29, 2005, URL: http://3gpp.org/ftp/tsg_ran/WG2_RL2/TSGR2_48/Documents/R2-095517.zip.
Chang, Cheng-Ta: "Downlink Transmit Power Issues in a WCDMA Cellular System," Dec. 14, 2004, p. 3, Fig. 1, Retrieved online: http://wintech.ee.nctu.edu.tw/handoff/MediaTek/Material/Wintech/1214/Downlink%20Transmit%20Power%20Issues%20in%20a%20WCDMA%20Cellular%20System.pdf.
Ericsson: Discussion on SIR Measurement, TSG-RAN Working Group 4 (Radio) meeting #18, R4-010895, Berlin, Germany, 3GPP TS 25.101 V3.7.0, Jul. 9, 2001, URL: http://www.3gpp.org/ftp/tsg_ran/WG4_Radio/TSGR4_18/Docs/R4-010895.zip.
Gunnarsson, G. et al., "Location Trial System for Mobile Phones," Global Telecommunications Conference, 1998. GLOBECOM 98. The Bridge to Global Integration. IEEE, vol. 4, pp. 2211-2216, Nov. 8-12, 1998.
Hobfeld, T. et al., "Supporting Vertical Handover by Using a Pastry Peer-to-Peer Overlay Network," Fourth Annual IEEE International Conference on Pervasive Computing and Communications Workshops, 2006. Percom Workshops 2006. Mar. 13-17, 2006, pp. 163-167, p. 164, paragraph III, IEEE, Piscataway, NJ, USA, XP010910514, ISBN: 0-7695-2520-2.
LG Electronics Inc., "Relative Buffer Status Reporting," 3GPP TSG-RAN WG2 meeting #46bis, R2-050852, Apr. 4, 2005, pp. 1-3, URL, http://www.3gpp.org/ftp/tsg_ran/WG2_RL2/TSGR2_46bis/Documents/R2-050852.zip.
Samsung: "Uplink control signaling structure (Revision of R1-041086)," 3GPP TSG-RAN WG1 Meeting #38bis, Tdoc R1-041222, 3GPP, Sep. 20, 2004, URL: http://www.3gpp.org/ftp/tsg_ran/WG1_RL1/TSGR1_38bis/Dcs/R1-041222.zip.
Taiwan Search Report—TW095148274—TIPO—Nov. 27, 2012.
TIM/TILAB, Blu, Mobilkom Austria, One2one,Telefonica: "Reintroduction of SIR measurement," 3GPP TSG-RAN4 Meeting #17, R4-010647, 3GPP, Goteborg, Sweden, May 21, 2001, URL: http://www.3gpp.org/ftp/tsg_ran/WG4_Radio/TSGR4_17/Docs/R4-010647.Zip.
Taiwan Search Report—TW095148274—TIPO—Sep. 25, 2013.
European Search Report—EP14194480—Search Authority—Berlin—Mar. 10, 2015.
Taiwan Search Report—TW095148274—TIPO—Jul. 22, 2014.
Wada, "Study of an OFDM Cellular System Using a Single Band," 2002 Communication Society Convention, Collection of Lecture Papers 1, Japan, IEEE, Aug. 20, 2002, p. 355, B-5-58.
Gunnarson, F., et al.: "Uplink Admission Control in WCDMA Based on Relative Load Estimates", IEEE International Conference on Communications, vol. 1, pp. 3091-3095, IEEE, New York, NY USA (Apr. 28, 2002).
Wada, "Study of an ORDM Cellular System Using a Single Band," 2002 Communication Society Convention, Collection of Lecture Papers 1, Japan, IEEE, Aug. 20, 2002, p. 355, B-5-58.

* cited by examiner

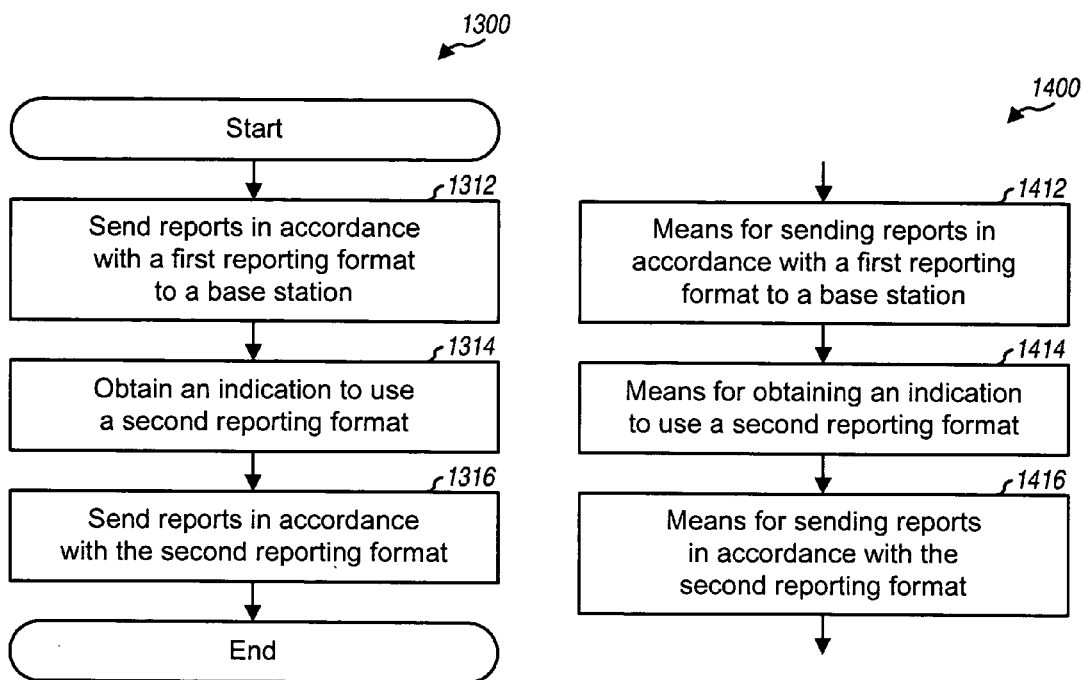

EFFICIENT REPORTING OF INFORMATION IN A WIRELESS COMMUNICATION SYSTEM

The present application is a continuation-in-part of U.S. patent application Ser. No. 10/648,766, filed Aug. 25, 2003 which issued as U.S. Pat. No. 7,218,948 on May 15, 2007 and which claims the benefit of U.S. Provisional Patent Application Ser. No. 60/449,729 filed Feb. 24, 2003, and this application claims the benefit of provisional U.S. Application Ser. No. 60/752,973, entitled "COMMUNICATIONS METHODS AND APPARATUS," filed Dec. 22, 2005, assigned to the assignee hereof and incorporated herein by reference.

BACKGROUND

I. Field

The present disclosure relates generally to communication, and more specifically to techniques for reporting information in a wireless communication system.

II. Background

A wireless multiple-access communication system can concurrently support communication for multiple terminals on the downlink and uplink. The downlink (or forward link) refers to the communication link from the base stations to the terminals, and the uplink (or reverse link) refers to the communication link from the terminals to the base stations.

The terminals may be located throughout the system and may observe different channel conditions. Furthermore, these terminals may have different data requirements and/or capabilities. The terminals may report various types of information in order to obtain adequate service from the system and to ensure proper system operation. For example, a terminal may estimate the channel quality of the downlink for a base station and may send a channel quality report on the uplink to the base station. The base station may use the channel quality report to assign radio resources to the terminal and/or to select a suitable data rate for transmission on the downlink to the terminal.

The information reported by the terminals, although pertinent or important, represents overhead in the system. Hence, it is desirable to send the information as efficiently as possible so that more of the available radio resources can be used to send data. There is therefore a need in the art for techniques to efficiently report information in a wireless communication system.

SUMMARY

Techniques for efficiently sending reports in a wireless communication system are described herein. The reports may convey various types of information such as channel quality, request for radio resources, available transmit power, interference, backlog information, sector information, and so on.

In an embodiment, reports are sent repetitively in accordance with a reporting format. A terminal receives an assignment of a control channel used to send reports and determines a reporting format to use based on the assignment. For example, one reporting format may be used for a full (e.g., full-tone) assignment of the control channel, and another reporting format may be used for a partial (e.g., split-tone) assignment. A reporting format indicates a specific sequence of reports sent in specific locations of a control channel frame. A reporting format may also have other features, as described below. The terminal generates a set of reports for each reporting interval and arranges the set of reports in accordance with the reporting format. The terminal repetitively sends a plurality of sets of reports in a plurality of reporting intervals using the reporting format.

In another embodiment, reports are adaptively sent based on operating conditions. A terminal sends reports in accordance with a first reporting format to a base station. The first reporting format may be a default reporting format or may be selected based on the current operating conditions of the terminal. The operating conditions may be characterized by the environment (e.g., mobility) of the terminal, capabilities of the terminal, quality of service (QoS) of traffics for the terminal, and so on. Changes in the operating conditions are detected. A second reporting format is then selected based on the detected changes in the operating conditions. The terminal thereafter sends reports in accordance with the second reporting format. An appropriate reporting format may be selected for use whenever changes in the operating conditions are detected.

Various aspects and embodiments of the invention are described in further detail below.

BRIEF DESCRIPTION OF THE DRAWINGS

Aspects of embodiments of the invention will become more apparent from the detailed description set forth below when taken in conjunction with the drawings in which like reference characters identify correspondingly throughout.

FIG. 13 shows a process to send reports based on operating conditions.

FIG. 14 shows an apparatus to send reports based on operating conditions.

DETAILED DESCRIPTION

The word "exemplary" is used herein to mean "serving as an example, instance, or illustration." Any embodiment or design described herein as "exemplary" is not necessarily to be construed as preferred or advantageous over other embodiments or designs.

Figure 1:
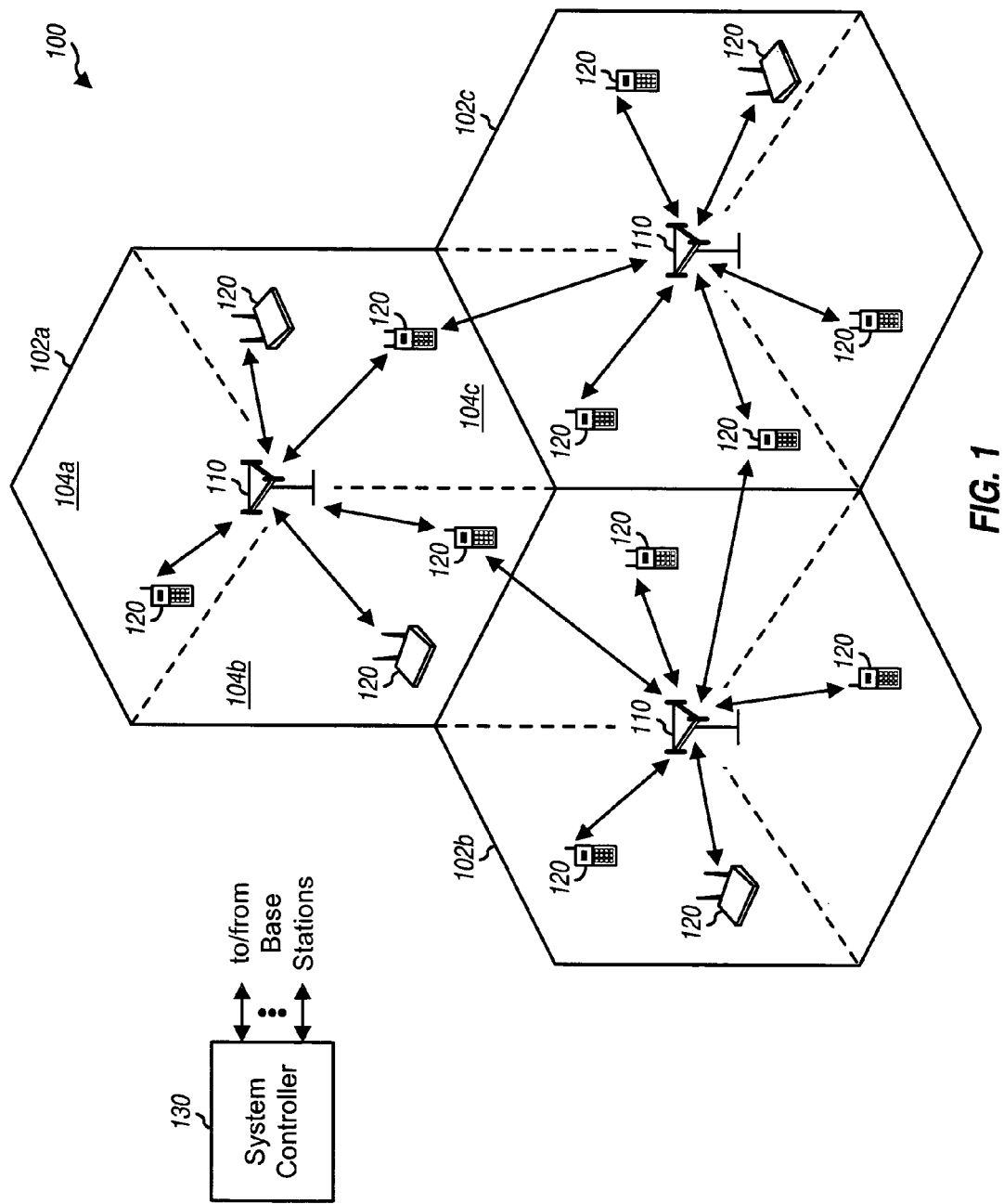
FIG. 1 shows a wireless communication system.

FIG. 1 shows a wireless communication system 100 with multiple base stations 110 and multiple terminals 120. A base station is a station that communicates with the terminals. A base station may also be called, and may contain some or all of the functionality of, a Node B, an access point, and/or some other network entity. Each base station 110 provides communication coverage for a particular geographic area 102. The term "cell" can refer to a base station and/or its coverage area depending on the context in which the term is used. To improve system capacity, a base station coverage area may be partitioned into multiple smaller areas, e.g., three smaller areas 104a, 104b, and 104c. Each smaller area may be served by a respective base station sector (BSS), which may also be referred to as a base transceiver subsystem (BTS). The term "sector" can refer to a BSS and/or its coverage area depending on the context in which the term is used. For a sectorized cell, the BSSs for all sectors of that cell are typically co-located within the base station for the cell. The reporting techniques described herein may be used for systems with sectorized cells as well as systems with un-sectorized cells. In the following description, the term "base station" generically refers to a station that serves a cell as well as a station that serves a sector.

For a centralized architecture, a system controller 130 couples to base stations 110 and provides coordination and control for these base stations. System controller 130 may be a single network entity or a collection of network entities. For a distributed architecture, the base stations may communicate with one another as needed.

Terminals 120 may be dispersed throughout the system, and each terminal may be stationary or mobile. A terminal may also be called, and may contain some or all of the functionality of, a wireless terminal (WT), an access terminal (AT), a mobile station (MS), a user equipment (UE), a subscriber station and/or some other entity. A terminal may be a wireless device, a cellular phone, a personal digital assistant (PDA), a wireless modem, a handheld device, and so on. A terminal may communicate with one or more base stations via transmissions on the downlink and uplink. In the following description, the terms "terminal" and "user" are used interchangeably.

The reporting techniques described herein may be used for various wireless communication systems. These techniques may also be used for various radio technologies and multiple-access schemes such as Code Division Multiple Access (CDMA), Time Division Multiple Access (TDMA), Frequency Division Multiple Access (FDMA), Orthogonal FDMA (OFDMA), Flash-OFDM®, and Single-Carrier FDMA (SC-FDMA). OFDMA and SC-FDMA partition a frequency band (e.g., the system bandwidth) into multiple orthogonal tones, which are also called subcarriers, sub-bands, bins, and so on. Each tone may be modulated with data. In general, modulation symbols are sent in the frequency domain with OFDMA and in the time domain with SC-FDMA. The techniques may also be used for wireless communication systems that utilize a combination of multiple-access schemes, e.g., OFDMA and CDMA.

For clarity, certain aspects of the reporting techniques are described below for an exemplary OFDMA system. In general, the OFDMA system may utilize any tone structure with any number of total tones and any number of usable tones. In an exemplary embodiment, the OFDMA system utilizes a tone structure with 128 total tones and 113 usable tones. An OFDM symbol may be generated in a manner known in the art and sent in an OFDM symbol period (or simply, a symbol period).

The reporting techniques described herein may be used with various signal structures. A signal structure indicates the manner in which data and signaling are sent. For clarity, an exemplary signal structure is described below.

Figure 2:
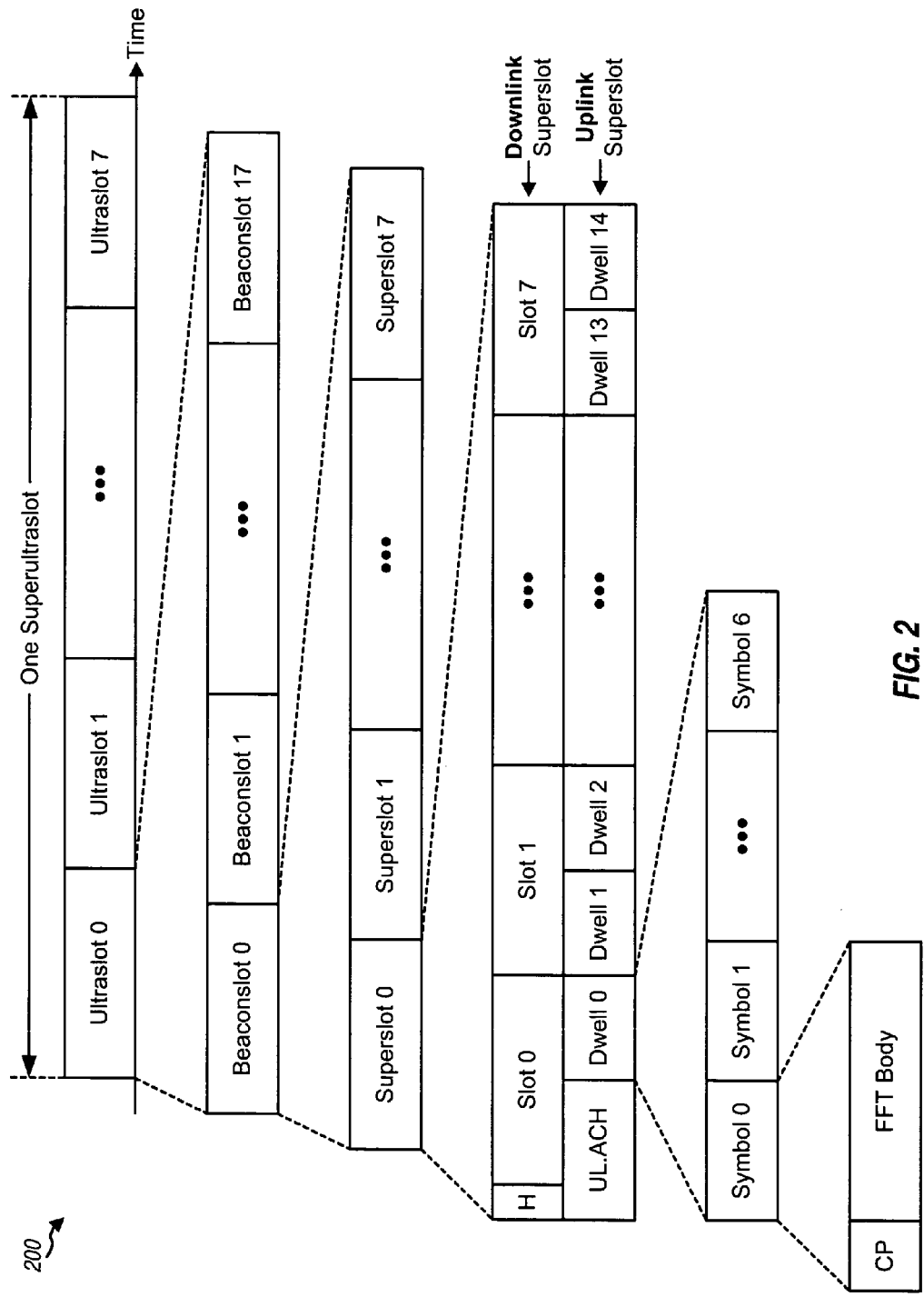
FIG. 2 shows an exemplary signal structure.

FIG. 2 shows an embodiment of a signal structure 200. The timeline for transmission is divided into superultraslots. Each superultraslot has a predetermined time duration (e.g., around 13.1 seconds) and includes eight ultraslots with indices 0 through 7. Each ultraslot includes 18 beaconslots with indices 0 through 17, and each beaconslot includes eight superslots with indices 0 through 7. For the downlink, each superslot includes a header (H) followed by eight slots with indices 0 through 7. The superslot header spans two symbol periods, each slot spans 14 symbol periods, and each superslot spans 114 symbol periods. For the uplink, each superslot includes an uplink access channel (UL.ACH) followed by 15 dwells with indices 0 through 14. The UL.ACH spans 9 symbol periods, each dwell spans 7 symbol periods, and each superslot spans 114 symbol periods.

FIG. 2 shows a specific signal structure. Various other signal structures may also be used, and this is within the scope of the present invention. For clarity, the reporting techniques are described below for the signal structure shown in FIG. 2.

In an embodiment, a terminal is assigned segments of a dedicated control channel (DCCH) upon transiting to an ON state of a connection with a base station. A connection may be considered as a collection of channels established between the terminal and the base station for the physical (PHY) and/or Medium Access Control (MAC) layers. The terminal may be able to receive data on the downlink and/or transmit data on the uplink while in the ON state. The terminal uses the assigned DCCH segments to send reports on the uplink to the base station. These reports may be for various types of information, as described below.

The DCCH may be implemented in various manners. In an embodiment, the DCCH comprises a set of logical tones (e.g., 31 logical tones), which are also referred to as DCCH tones. Each DCCH tone may be mapped to a specific usable/physical tone in each dwell and may hop from physical tone to physical tone in different dwells based on a tone hopping operation.

Figure 3:
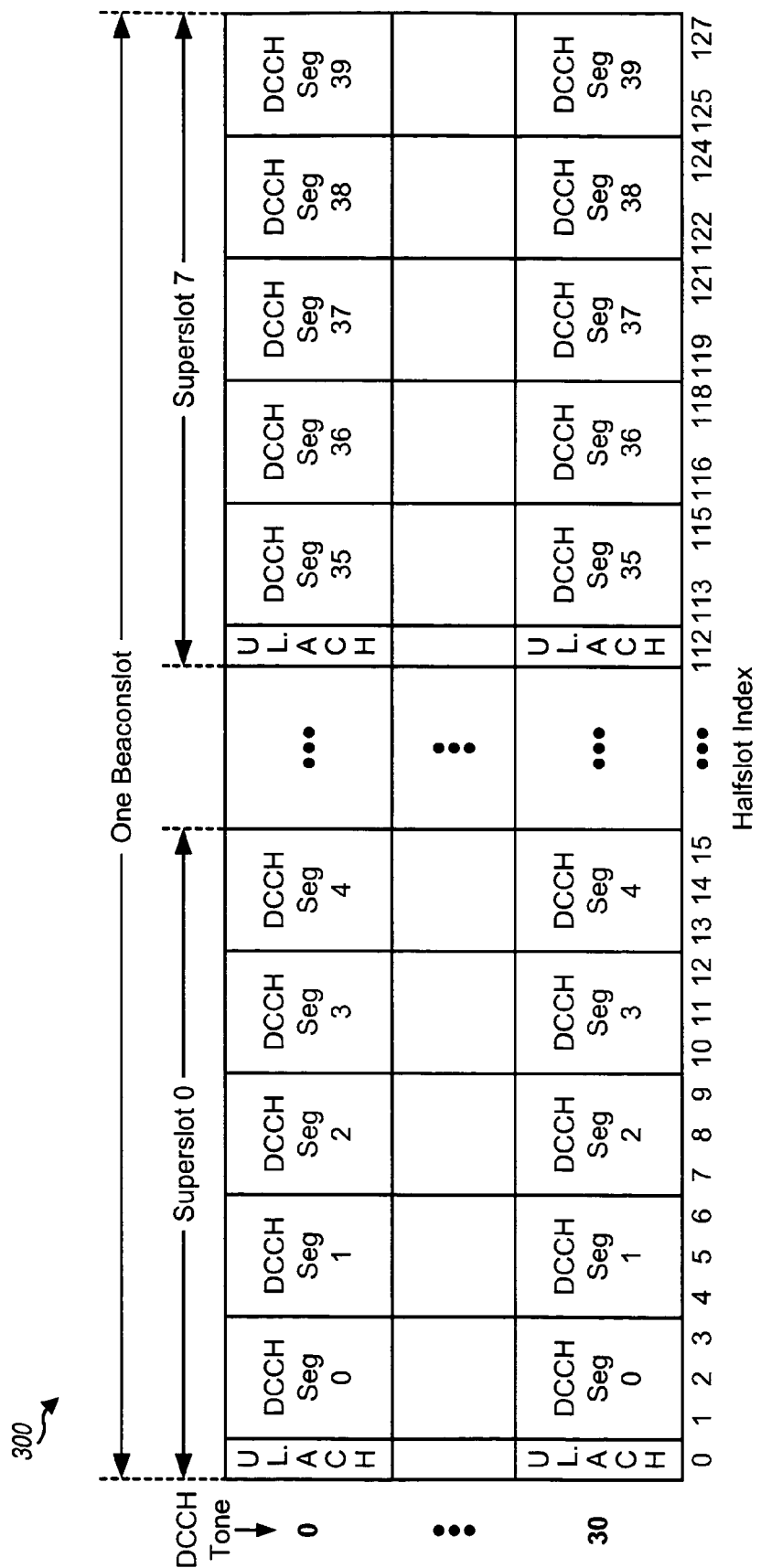
FIG. 3 shows an exemplary structure of a dedicated control channel (DCCH).

FIG. 3 shows an embodiment of a DCCH structure 300. In this embodiment, 40 DCCH segments with indices 0 through 39 are defined for each DCCH tone in each beaconslot. A beaconslot includes 64 slots or equivalently 128 halfslots with indices 0 through 127. Each DCCH segment uses one tone and spans three halfslots. Five DCCH segments are formed with the last 15 halfslots of each superslot, with the first halfslot being used for the UL.ACH. Thus, DCCH segments 0 through 4 are formed with halfslots 1 through 15 in superslot 0, DCCH segments 5 through 9 are formed with halfslots 17 through 31 in superslot 1 (not shown in FIG. 3), and so on, and DCCH segments 35 through 39 are formed with halfslots 125 through 127 in superslot 7.

In the embodiment shown in FIG. 3, 31 logical tones are used for the DCCH, 40 DCCH segments are defined for each DCCH tone in each beaconslot, and a total of 1240 DCCH segments are available in each beaconslot. The available DCCH segments may be assigned to terminals in various manners.

Figure 4:
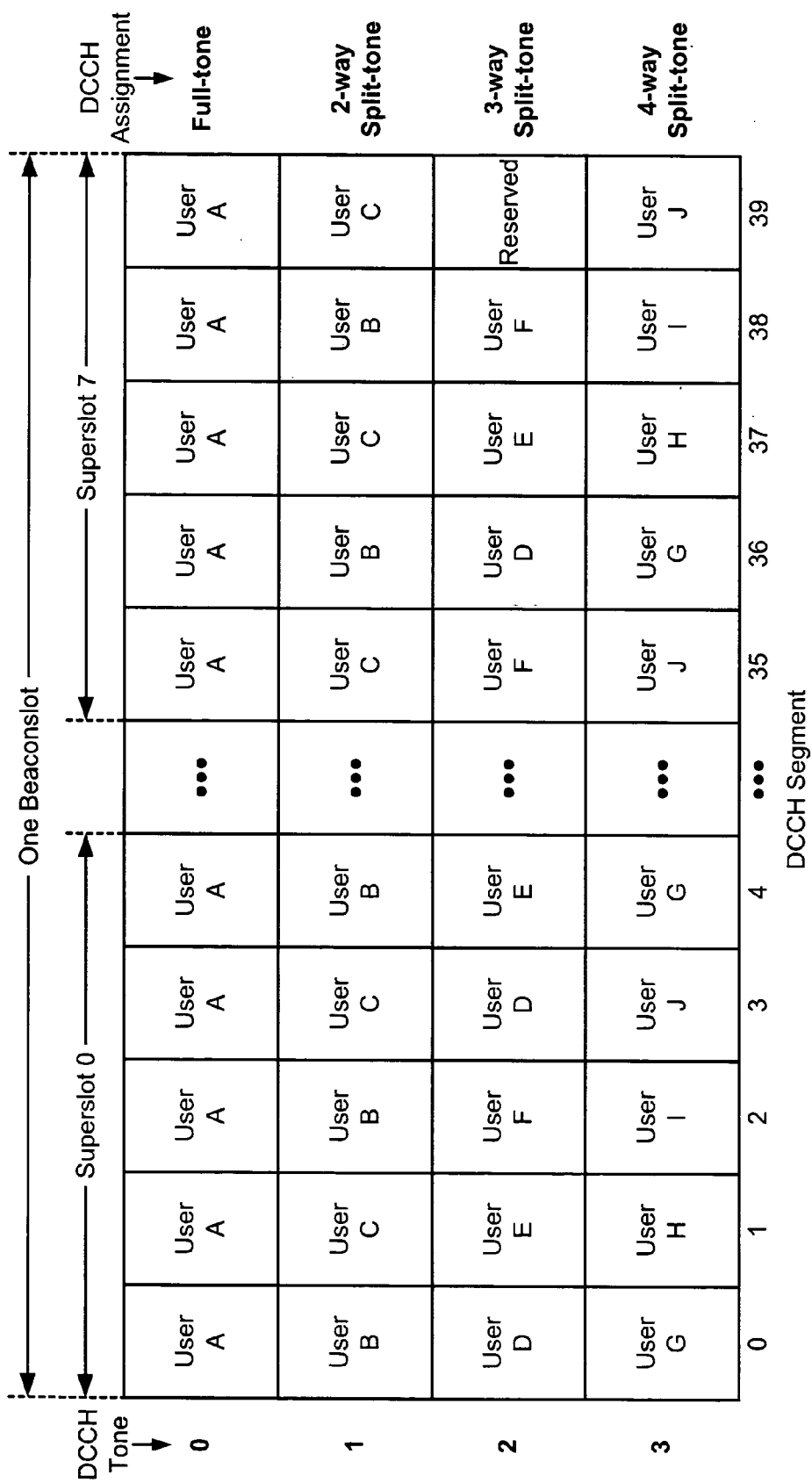
FIG. 4 shows exemplary assignments of the DCCH.

FIG. 4 shows an exemplary assignment scheme for the DCCH structure shown in FIG. 3. In an embodiment, each DCCH tone may be assigned to one or multiple users. Multiple DCCH modes may be defined. Each DCCH mode may correspond to a specific number of users being assigned a given DCCH tone. In a full DCCH mode, which is also called a full-tone format/assignment, a DCCH tone is assigned to one user, who may send reports in all DCCH segments on that tone. In a half DCCH mode, which is also called a 2-way split-tone format/assignment, a DCCH tone is assigned to two users. In a one-third DCCH mode, which is also called a 3-way split-tone format/assignment, a DCCH tone is assigned to three users. In a quarter DCCH mode, which is also called a 4-way split-tone format/assignment, a DCCH tone is assigned to four users. Other DCCH modes may also be defined. For an N-way split-tone assignment, where N>1, N users may send reports in a time division multiplexed (TDM) manner in the DCCH segments of one DCCH tone. The DCCH segments may be assigned to the N users by repeatedly cycling through these users and assigning one DCCH segment to each user in each cycle. Each user is then assigned DCCH segments that are uniformly distributed across time, as shown in FIG. 4. For all assignments, each user may send reports in the DCCH segments assigned to that user.

FIGS. 3 and 4 show specific embodiments of a structure and an assignment scheme for the DCCH. These embodiments provide frequency diversity through frequency hopping and time diversity through assignment of DCCH segments that are spread across time. The DCCH may also be implemented in other manners and may be partitioned and assigned to users in other manners. For example, the DCCH may be implemented with specific tones in specific symbol periods. As another example, the users may be assigned multiple DCCH segments in a given time interval. For clarity, much of the description below is for the embodiments shown in FIGS. 3 and 4.

Figure 5:
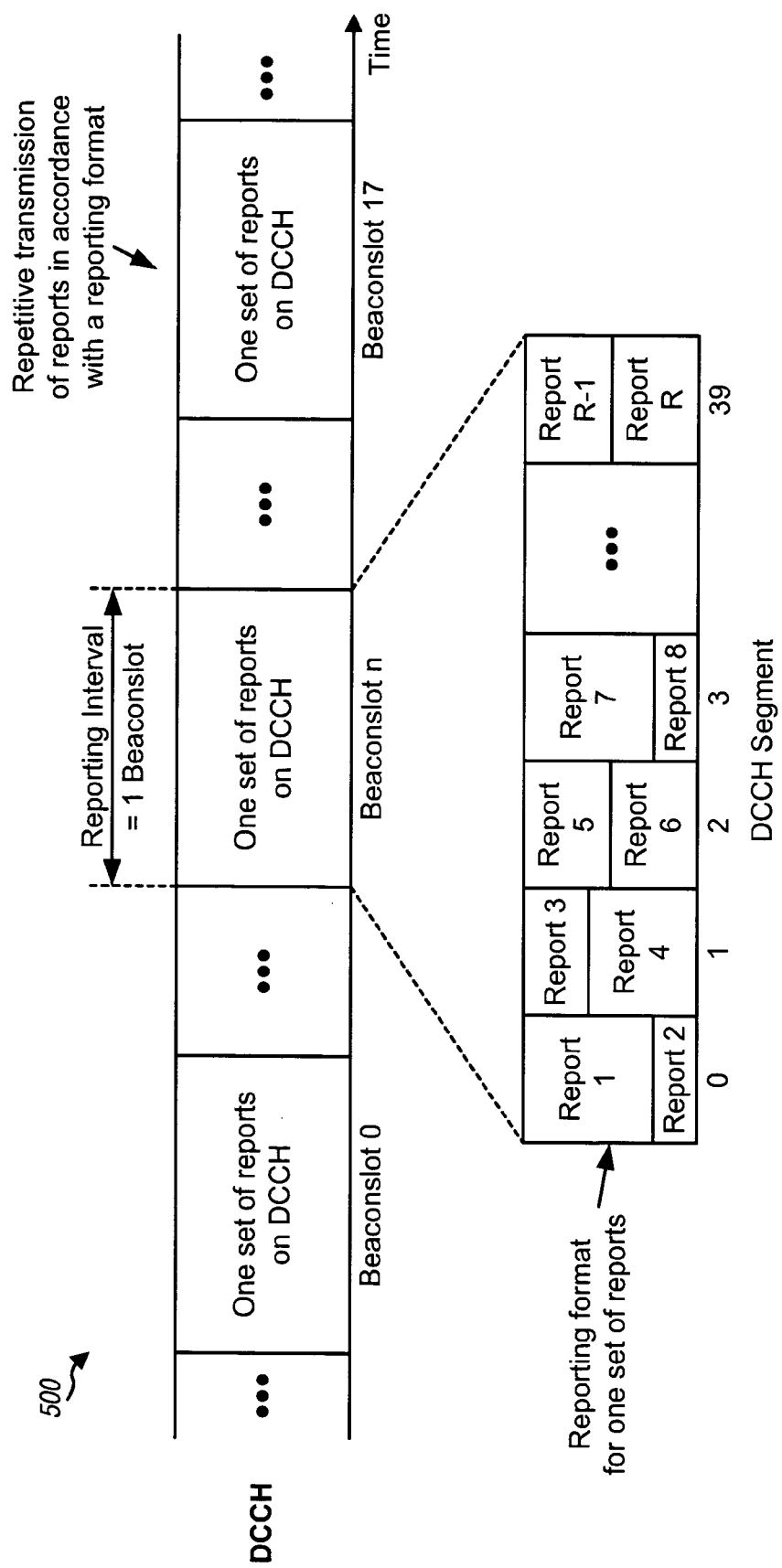
FIG. 5 shows a report transmission scheme for the DCCH.

FIG. 5 shows an embodiment of a report transmission scheme 500 for the DCCH. In this embodiment, a terminal sends one set of reports on the DCCH in each reporting interval of one beaconslot to a base station. Each set of reports is sent using a reporting format that is either known a priori or can be ascertained by both the terminal and the base station.

In general, a reporting format is a structure for sending one or more reports. A reporting format may convey various parameters such as which types of report are sent, how often reports of each type are sent, the location and length of each report, and/or other information. A reporting format may also be called a reporting structure, a control channel format, a DCCH format, and so on. Reports may be efficiently sent using a reporting format since overhead information (e.g., headers) is generally not needed to convey report type, location, size, and format of each report sent using the reporting format. All or most of the overhead information is implicit from the reporting format. The reports may thus contain all or mostly useful information and little or no overhead information.

As shown in FIG. 5, reports may be sent periodically using the same reporting format for each reporting interval, which is one beaconslot in FIG. 5. The same set of reports would then be sent in each reporting interval. However, the values in the reports may change from one report set to another report set based on measurement results and/or conditions in different reporting intervals. The interpretation of the reports in each set remains fixed and is determined by the reporting format.

A terminal may send various types of report. Table 1 lists some report types and gives a short description for each report type.

TABLE 1

| Report Type | Description |
| --- | --- |
| DL SNR | Convey signal-to-noise ratio (SNR) or channel quality of the downlink for a base station as measured at the terminal. |
| UL request | Convey backlog information for the terminal. |
| Delay information | Convey delay experienced by data to be sent by the terminal. |
| DCCH backoff | Convey available transmit power at the terminal. |
| Beacon ratio | Convey interference information. |
| Self-noise SNR | Convey the highest achievable SNR at the terminal. |
| Sector boundary | Convey information about whether the terminal is at the boundary of two sectors and if so, which sector boundary. |

DL SNR denotes downlink channel quality or received SNR observed at the terminal for a base station. The terminal may receive transmission on the downlink from one or multiple base stations. The terminal may measure the DL SNR of each base station based on a downlink pilot channel (DL.PICH) sent by that base station. The terminal may generate full and delta DL SNR reports for each base station. A full DL SNR report gives the DL SNR measured in the current reporting interval. A delta DL SNR report gives a delta SNR, which is the difference between the DL SNR in the current reporting interval and the DL SNR in a prior reporting interval. The delta SNR is also referred to as a relative SNR or a differential SNR. If the terminal can receive downlink transmission from multiple base stations, then a full DL SNR report for a base station may also indicate whether that base station is preferred or not preferred.

Self-noise SNR is the saturation level of the DL SNR and is the SNR that a receiver at the terminal would observe for a received signal if the base station transmits the signal at infinite power. The saturation level of the DL SNR is determined by self-noise of the terminal receiver, which may be caused by channel estimation errors and/or other factors. The terminal may determine the saturation level of the DL SNR as follows. The terminal may assume that if a base station transmits at power P, then the DL SNR may be given as:

$$SNR(P) = \frac{G \cdot P}{a_0 \cdot G \cdot P + N}, \quad \text{Eq (1)}$$

where G represents the path gain of the wireless channel from the base station to the terminal. The quantities in equation (1) are given in linear units.

The term $G \cdot P$ represents the received signal power at the terminal. The term N represents the received interference power. The term $a_0 \cdot G \cdot P$ represents self-noise, so that a higher value of $a_0$ denotes a higher value of self-noise. The terminal may measure the received power of a downlink null channel (DL.NCH) to determine the interference power N. The terminal may also measure the received power (denoted as $G \cdot P_0$) and SNR (denoted by $SNR_0$) of the DL.PICH. The saturation level of the DL SNR is equal to $1/a_0$ and may be computed as follows:

$$\text{Self-noise } SNR = \frac{1}{a_0} = \left( \frac{1}{SNR_0} - \frac{N}{G \cdot P_0} \right)^{-1}. \quad \text{Eq (2)}$$

The quantities in equation (2) are given in linear units.

The UL request conveys backlog information at the terminal. The terminal may maintain one or more (e.g., up to four) MAC frame queues. Each MAC frame queue may buffer MAC frames for one request group. The MAC frames may be generated from packets of upper layer protocols. Each packet may be mapped to one request group, and all MAC frames generated for that packet may be placed in the associated MAC frame queue. The UL request may convey the number of MAC frames in the (e.g., four) request groups that the terminal may transmit, which represent the backlog information for the terminal. The base station may assign traffic channel segments (or radio resources) to the terminal based on the backlog information, channel conditions, and/or other factors such as the priority of data to be sent by the terminal.

The delay information conveys the amount of delay experienced by the data to be sent by the terminal. The terminal may keep track of the delay experienced by the MAC frames in each request group. For example, the terminal may maintain D[k] which indicates the current head-of-line delay experienced by the oldest MAC frames in request group k, for k=0, . . . , 3. The delay information may then comprise the delays, or D[k], of the MAC frames in the request groups. The base station may take the delay information into consideration in assigning traffic channel segments to the terminal.

The DCCH backoff conveys the amount of transmit power available at the terminal for data transmission on the uplink. The terminal may adjust the transmit power of the DCCH to achieve a target level of performance for the reports sent on the DCCH. The terminal has a certain maximum transmit power, which may be dependent on the design of the terminal. The DCCH backoff is the difference between the maximum transmit power and the DCCH transmit power and may be given as follows:

$$\text{wtULDCCHBackOff} = \text{wtPowerMax} - \text{wtULDCCHTx Power}, \quad \text{Eq (3)}$$

where wtULDCCHTxPower is the per-tone transmit power of the UL.DCCH, wtPowerMax is the maximum transmit power of the terminal, and wtULDCCHBackOff is the DCCH backoff.

All of the quantities in equation (3) are given in units of dBm. The DCCH backoff may be used to assign a suitable number of tones and/or to select a suitable data rate for transmission on the uplink.

The beacon ratio conveys interference potentially caused by the terminal to different base stations and may be used for interference management on the uplink. The terminal may measure the channel gain (or signal strength) of neighbor base stations relative to the channel gain of a serving base station. The terminal may measure the received power of the beacon ($PB_0$) and the received power of the pilot channel ($PP_0$) of the serving base station. The terminal may similarly measure the received power of the beacon ($PB_i$) and the received power of the pilot channel ($PP_i$) of each neighbor base station i. The terminal may then compute a channel gain ratio $G_i$ for base station i, as follows:

$$G_i = \frac{PB_i}{PB_0} \text{ or } G_i = \frac{PB_i}{PP_0 \cdot K \cdot Z_0}, \quad \text{Eq (4)}$$

where K is the ratio of the per-tone transmit power of the beacon to the transmit power of the pilot channel, and $Z_0$ is a scaling factor that is dependent on how the tones are used in the serving base station.

A generic beacon ratio report (BNR) may be generated based on the channel gain ratios of the neighbor base stations, as follows:

$$\text{Generic } BNR = \frac{b_0}{G_1 \cdot b_1 + G_2 \cdot b_2 + \ldots}, \text{ or } \quad \text{Eq (5)}$$

$$\text{Generic } BNR = \frac{b_0}{\max\{G_1 \cdot b_1, G_2 \cdot b_2, \ldots\}}, \quad \text{Eq (6)}$$

where $b_0$ is an uplink loading factor broadcast by the serving base station, and $b_i$ is an uplink loading factor broadcast by neighbor base station i.

The quantities in equations (5) and (6) are given in linear units. Uplink loading factor b indicates the loading observed by base station i on the uplink for all terminals served by base station i. The uplink loading factor is used to indicate the amount of traffic load seen by base station i. The base stations may exchange or broadcast their loading factors to control uplink interference and increase the overall throughput.

The terminal may compute generic beacon ratio reports using equation (5) in beaconslots with even indices and using equation (6) in beaconslots with odd indices. The generic beacon ratio reports give the interference cost to all neighbor base stations (with equation (5)) or the closest neighbor base station (with equation (6)), if the terminal were to transmit to the serving base station.

A special beacon ratio report may be generated for neighbor base station k, as follows:

$$\text{Special } BNR = \frac{b_0}{G_k \cdot b_k}. \quad \text{Eq (7)}$$

The special beacon ratio report gives the interference cost to a specific base station k, if the terminal were to transmit to the serving base station.

The sector boundary conveys the information about whether the terminal is located at the boundary of two adjacent sectors of the same base station, and if so, which sector boundary. The sector boundary information may be used by the base station to coordinate the scheduling of the traffic channels in the two sectors to better service the terminal when the terminal is in the sector boundary. For example, the base station may reduce the transmission power at one sector so that the terminal will experience less interference from that sector.

Table 1 gives some types of report that may be sent by the terminal to support efficient data transmission and proper system operation. Fewer, different and/or additional types of report may also be sent, and this is within the scope of the present invention.

Figure 6:
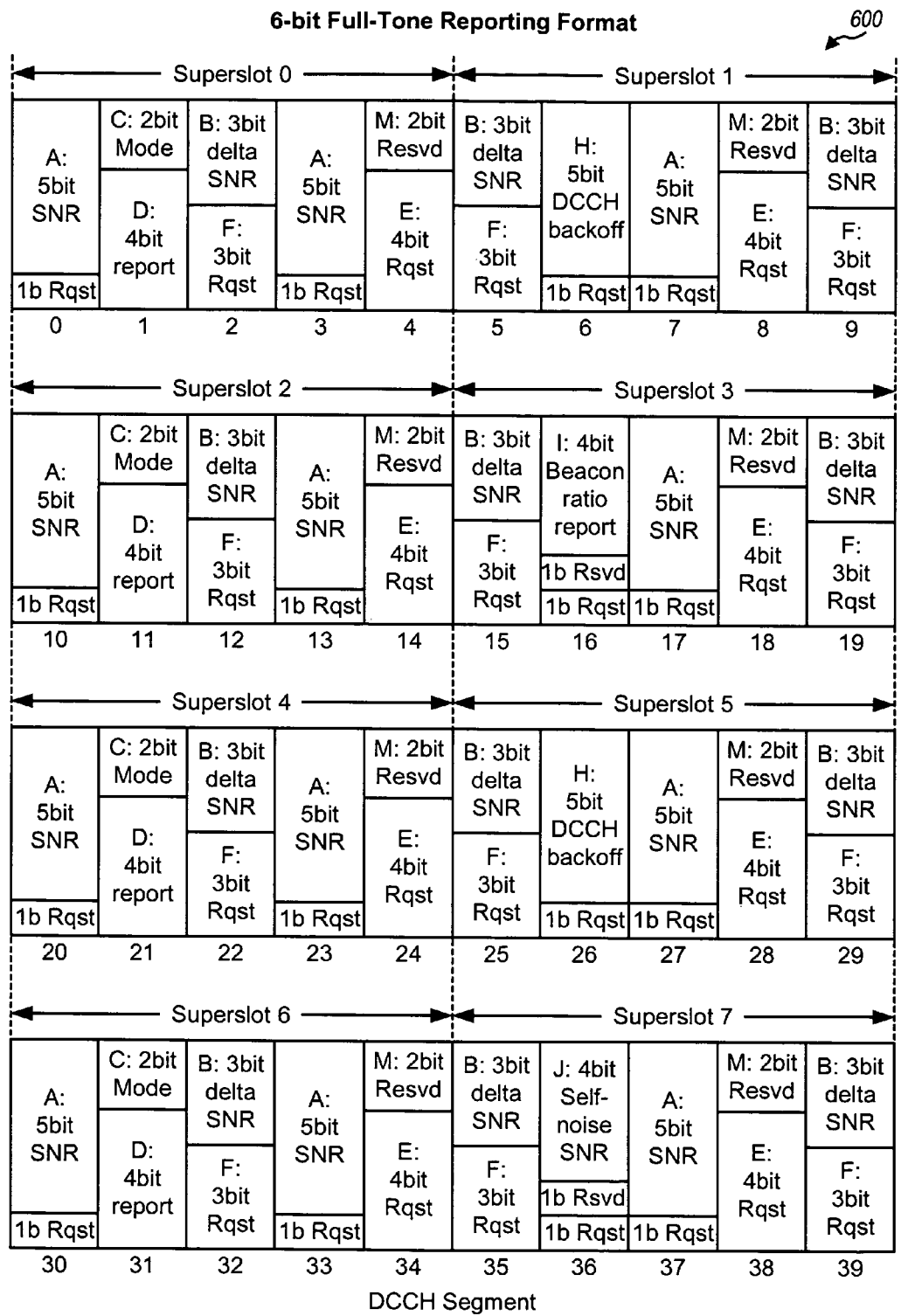
FIG. 6 shows a reporting format for a full-tone assignment of the DCCH.

FIG. 6 shows an embodiment of a reporting format 600 that may be used by a terminal with a full-tone assignment for the DCCH. Reporting format 600 covers a DCCH frame of 40 DCCH segments and may be sent in 8 superslots of one beaconslot. A DCCH frame is a unit of the DCCH used to send a set of reports in accordance with a reporting format. Reporting format 600 has six information bits in each DCCH segment. The reports sent in each DCCH segment of reporting format 600 are shown in FIG. 6. In particular, a 5-bit DL SNR report and a 1-bit UL request are sent in DCCH segment 0, a 2-bit Mode indicator and a 4-bit report are sent in DCCH segment 1, a 3-bit delta DL SNR report and a 3-bit UL request are sent in DCCH segment 2, and so on.

Table 2 lists the different types of report included in reporting format 600 and the number of reports of each type. For reporting format 600, field D may be configured to send a report of one of four possible types, which is indicated in field C. Configurable field D provides flexibility in sending reports at the expense of some overhead for field C.

TABLE 2

| Report Type/ Field | Size (bits) | Description | Format 600 No. of Reports | Format 700 No. of Reports |
|---|---|---|---|---|
| A | 5 | 5-bit full DL SNR report | 12 | 8 |
| B | 3 | 3-bit delta DL SNR report | 12 | 8 |
| C | 2 | Indicate the report being sent in field D: 00: 4-bit UL request 01: 4-bit self-noise SNR report 10: 4-bit sector information 11: 4-bit delay information | 4 | 8 |
| D | 4 | Variable report type as signaled in field C | 4 | 8 |
| E | 4 | 4-bit UL request | 8 to 12 | 8 to 16 |
| F | 3 | 3-bit UL request | 12 | 8 |
| G | 1 | 1-bit UL request | 16 | 16 |
| H | 5 | 5-bit DCCH backoff report | 2 | 4 |
| I | 4 | 4-bit beacon ratio report | 1 | 2 |
| J | 4 | 4-bit self-noise SNR report | 1 to 5 | 2 to 10 |
| K | 4 | 4-bit delay information | 0 to 4 | 0 to 10 |
| L | 4 | 4-bit sector information | 0 to 4 | 0 to 10 |
| M | 1 or 2 | Reserved | 10 | 12 |

Figure 7:
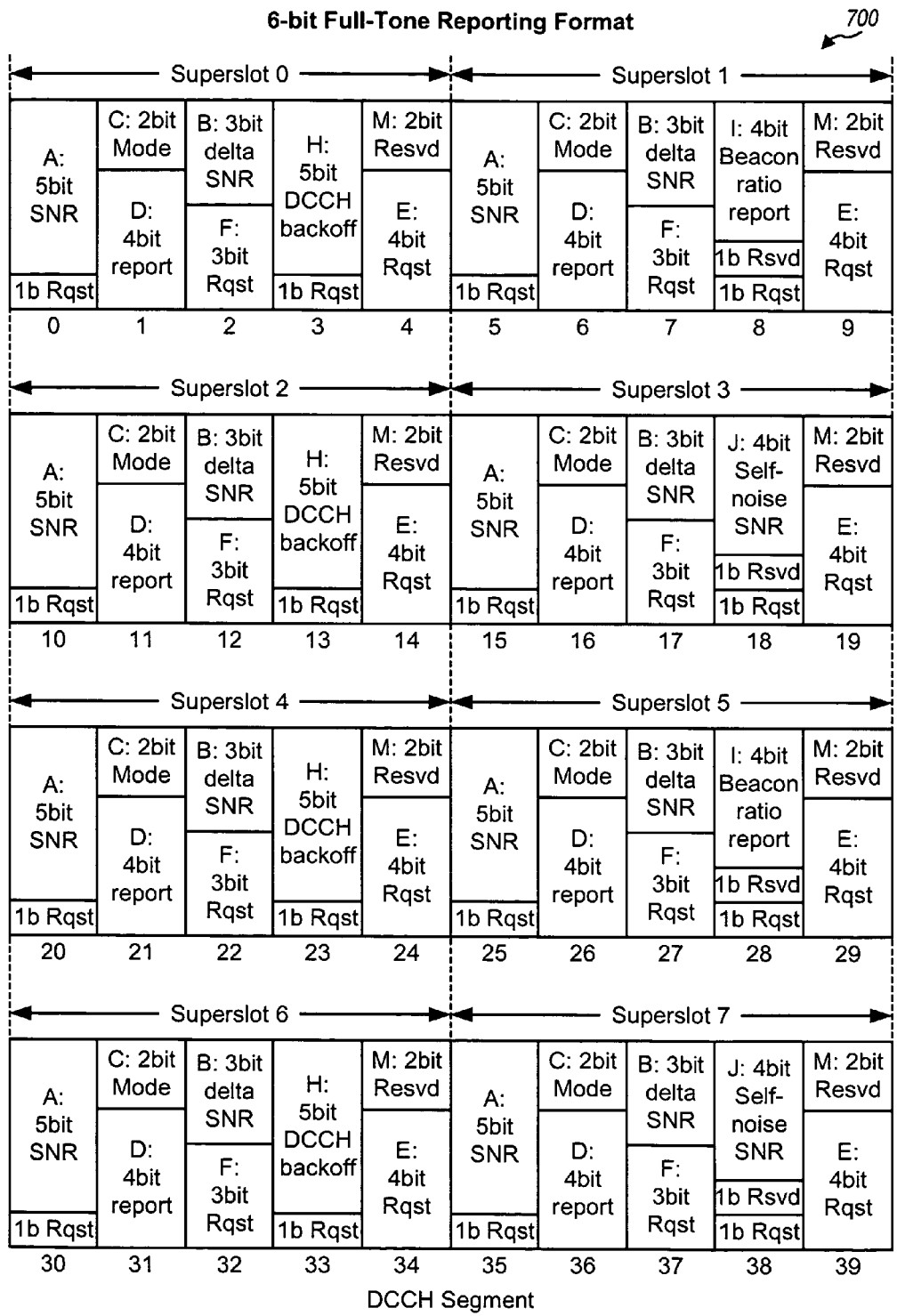
FIG. 7 shows another reporting format for the full-tone assignment.

FIG. 7 shows an embodiment of a reporting format 700 that may also be used by a terminal with a full-tone assignment for the DCCH. Reporting format 700 covers a DCCH frame of 40 DCCH segments and has six information bits in each DCCH segment. The reports sent in each DCCH segment of reporting format 700 are shown in FIG. 7. Reporting format 700 may be used for a more slowly varying channel. Hence, full and delta DL SNR reports are sent less frequently in reporting format 700 than in reporting format 600, as indicated in the last two columns of Table 2. The bits saved by sending fewer DL SNR reports are used for more configurable fields D.

Figure 8:
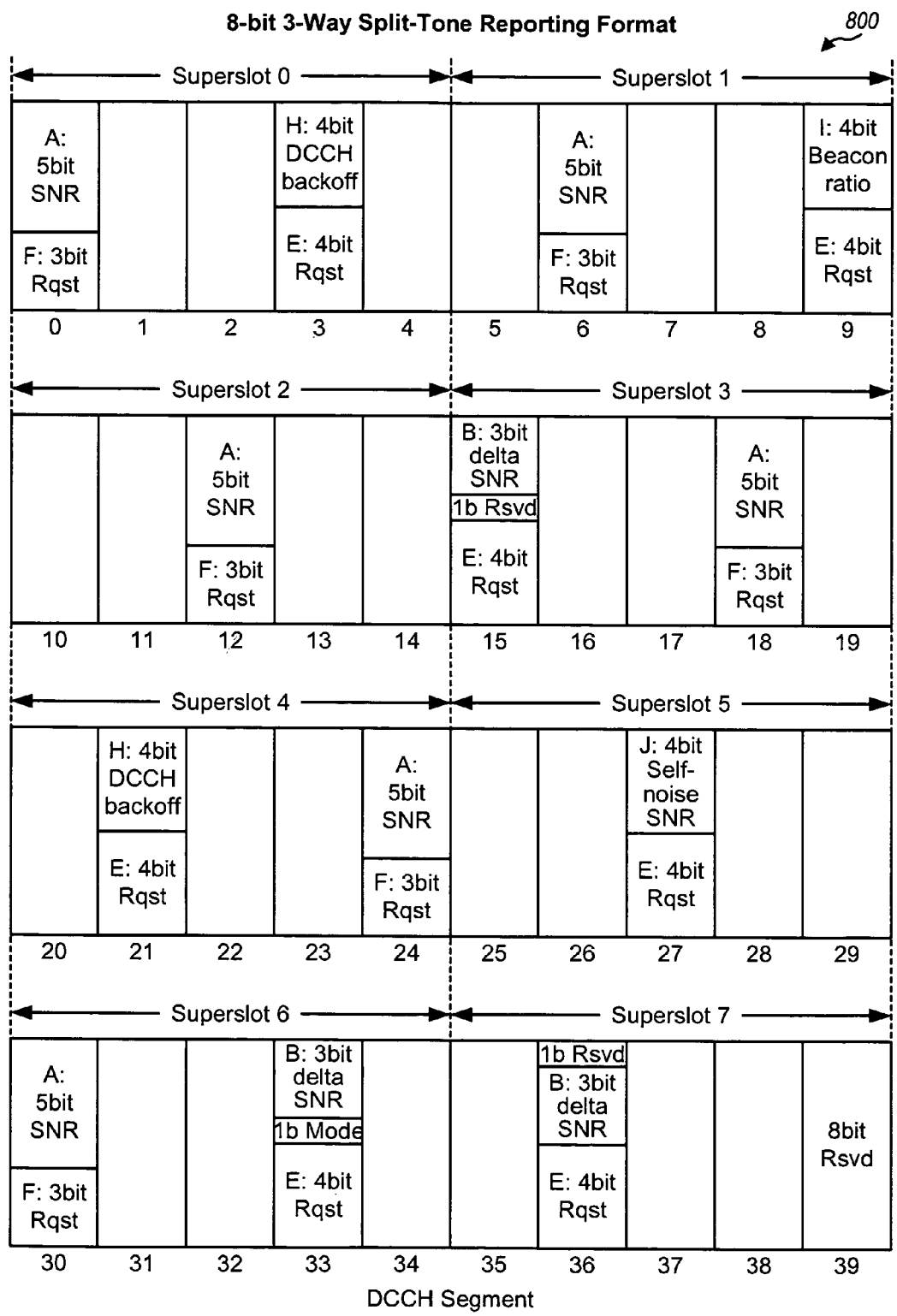
FIG. 8 shows a reporting format for a 3-way split-tone assignment.

FIG. 8 shows an embodiment of a reporting format 800 that may be used by a terminal with a 3-way split-tone assignment for the DCCH. Reporting format 800 covers a DCCH frame of 40 DCCH segments and has eight information bits in each DCCH segment. However, only 13 DCCH segments are assigned to the terminal, 26 other DCCH segments are assigned to other terminals, and the last DCCH segment is reserved (Rsvd). The reports sent in each assigned DCCH segment of reporting format 800 are shown in FIG. 8. Reports are generally sent at less frequent rate since fewer DCCH segments are available in reporting format 800.

In an embodiment, the terminal sends reports in accordance with a reporting format in each reporting interval upon receiving an assignment of the DCCH. In another embodiment, the terminal sends a special set of reports in the first superslot after receiving the DCCH assignment and thereafter sends reports using the reporting format. The special set of reports may include, e.g., a 4-bit UL request, a 5-bit DL SNR report, a self-noise SNR report, a beacon ratio report, a DCCH backoff report, and so on. The terminal may thus quickly provide all pertinent information to the base station in the special set of reports.

In the embodiments shown in FIGS. 6 and 7, six information bits may be sent in each DCCH segment. In the embodiment shown in FIG. 8, eight information bits may be sent in each DCCH segment. Each DCCH segment may comprise a fixed number of tone-symbols, e.g., 21 tone-symbols. A tone-symbol is one tone in one symbol period and may be used to send one modulation symbol. For a given number of tone-symbols, more information bits may be sent using a coding and modulation scheme having less redundancy and hence less reliability.

FIGS. 6 through 8 show specific embodiments of three reporting formats, each having a specific sequence of reports that is arranged in a specific order. Various other reporting formats may also be defined.

In an embodiment, for a given DCCH assignment (e.g., a full-tone assignment or a 3-way split-tone assignment), different reporting formats are defined for different operating conditions. The operating conditions of a terminal may be characterized by various factors such as the environment of the terminal, the capabilities of the terminal, the QoS of the traffics to be sent by the terminal, the manner in which the system operates, and so on. These factors may influence which types of report to send, how often to send reports of each type, and what information to include in each report.

The environment of the terminal may be characterized by various factors such as mobility of the terminal (e.g., low or high mobility), the channel conditions (e.g., low or high SNR), and so on. A reporting format for low mobility (e.g., stationary or low speed) may send SNR reports less frequently than a reporting format for high mobility (e.g., high speed). An SNR report for low mobility channel conditions may have more bits than an SNR report for high mobility channel conditions. The reason is that the SNR in high mobility channel conditions tends to vary. Given the loop latency association with SNR measurement and reporting, it may not be necessary to report the SNR very accurately. A reporting format with more reports and/or more bits for certain reports may be used for good channel conditions since the base station can reliably receive the reports with less coding redundancy.

The capabilities of the terminal may indicate whether the terminal supports one or multiple frequency channels (or tone blocks). The capabilities may also indicate whether the terminal supports single-input single-output (SISO), single-input multiple-output (SIMO), multiple-input single-output (MISO), and/or multiple-input multiple-output (MIMO) operation, which may have different reporting requirements. A single data stream may be sent on a single spatial channel with SISO, SIMO and MISO. Multiple data streams may be sent simultaneously on multiple spatial channels with MIMO. A reporting format for SISO, SIMO and MISO may send a single SNR value for one spatial channel in an SNR report. A reporting format for MIMO may send either multiple SNR values for multiple spatial channels in one SNR report or multiple SNR reports each with a single SNR value for one spatial channel.

The QoS of traffics may influence reporting. Different types of traffic (e.g., voice, video, packet data, etc.) may have different QoS. QoS may be quantified by delay tolerance, peak data rate, average data rate, delivery option, and/or other criteria. For example, voice may be associated with a short delay requirement, a fixed data rate, and best effort delivery because of the time sensitive nature of voice. Packet data may be associated with a longer delay requirement, a high peak data rate, and guaranteed delivery. A reporting format may include more UL requests and/or UL requests with more details when different QoS traffics are present.

The manner in which the system operates may also influence reporting. For example, the system may use time division duplexing (TDD) or frequency division duplexing (FDD). In a TDD system, the downlink and uplink share the same frequency band, and the downlink channel may be assumed to be reciprocal of the uplink channel. In this case, a base station may estimate the downlink channel conditions (e.g., DL channel gains and/or SNR) based on an uplink transmission (e.g., pilot) from the terminal. In an FDD system, the downlink and uplink use different frequency bands, and the downlink channel may not correlate well with the uplink channel. In this case, the terminal may estimate the downlink channel conditions and send reports to the base station. Different reporting formats may be used for TDD and FDD systems.

In general, a reporting format may comprise any combination of report types, any number of reports of each type, and any arrangement of the reports. The number of reports of each type may be selected based on the capacity of the control channel assignment used to send the report, the importance or criticality of that report type relative to other report types, how quickly information of that report type changes (which may be dependent on the environment), and/or other factors. Each report may be of any size and may have any format/structure. The reports may be arranged so that each report is sent completely in one transmission, e.g., in one DCCH segment as shown in FIGS. 6 through 8, which may improve the use of these reports. A report may also be sent in multiple transmissions, e.g., in multiple DCCH segments. A reporting format may include a combination of fixed and configurable fields, e.g., as shown in FIGS. 6 through 8. A reporting format may also include only fixed fields or only configurable fields.

In general, any number of reporting formats may be defined for a given control channel assignment. Each reporting format may be designed for certain operating conditions. In an embodiment, different reporting formats may include different reports that are more appropriate for different operating conditions covered by these reporting formats. In another embodiment, different reporting formats may have the same set of reports that may be arranged in different orders and/or have different formats/structures. The bit partition between different reports may be different for different reporting formats. For example, if a DCCH segment has a fixed number of information bits, then an UL request may drop from 4 bits down to 3 bits so that another report may gain an additional bit. Regardless of how the reporting formats may be defined, a suitable reporting format may be selected for use based on the current operating conditions of the terminal.

Figure 9:
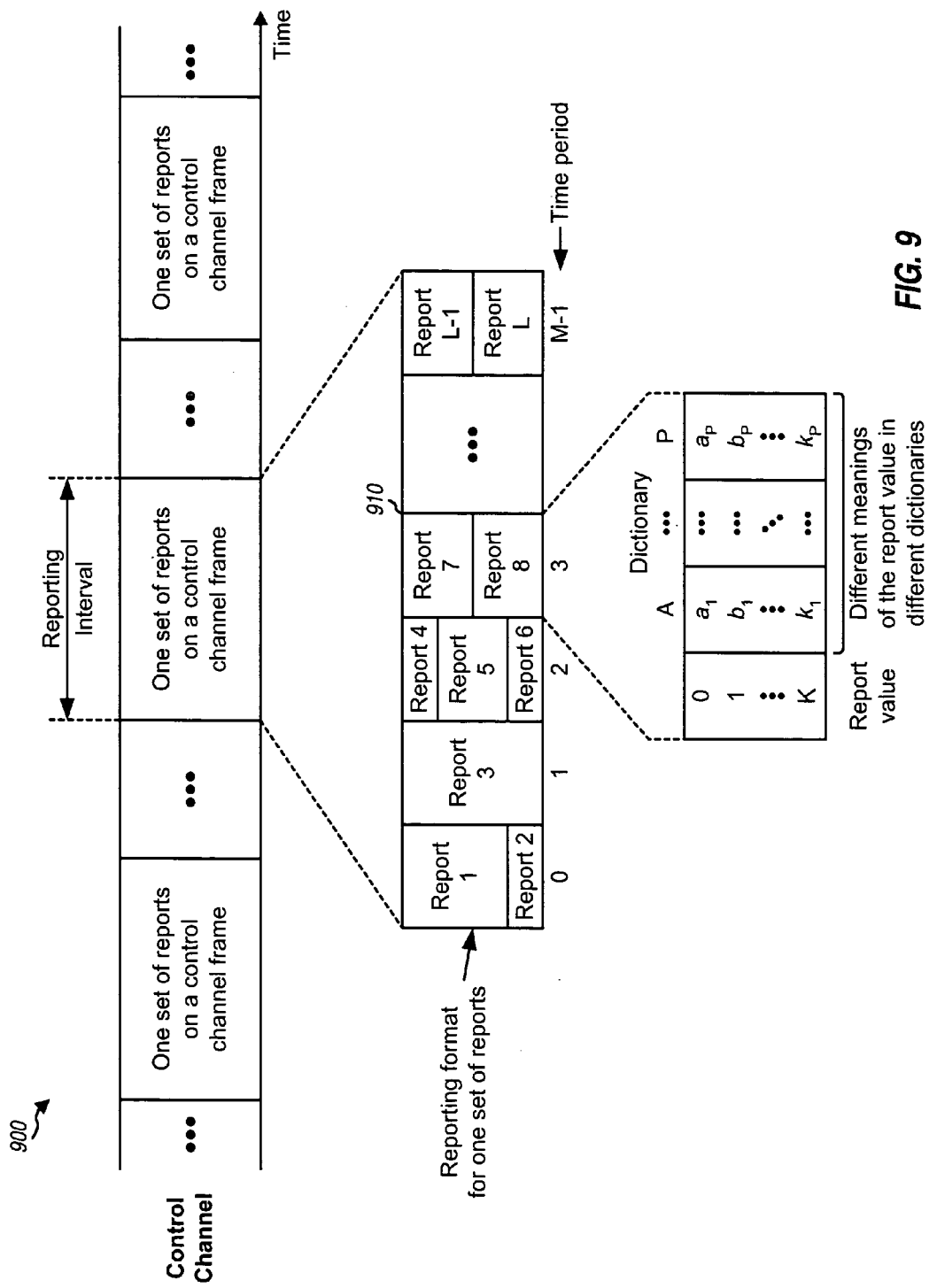
FIG. 9 shows a report transmission scheme for a control channel.

FIG. 9 shows an embodiment of a report transmission scheme 900 for a control channel, e.g., the DCCH. In this embodiment, one set of reports is sent on the control channel in each reporting interval, which may be of any time duration. Each set of reports is sent using a reporting format 910 in one control channel frame. In this embodiment, reporting format 910 includes L reports that are sent in M time periods, where in general L≥1 and M≥1. A time period may be any duration of time and may span one or more symbol periods. A time period may correspond to three halfslots as shown in FIG. 3 or some other time duration. The M time periods may have equal or different durations. Any number of information bits may be sent in each time period. Reporting format 910 may include any types of report and any number of reports of each type. Each report may have any size and may be sent in one or more time periods. As shown in FIG. 9, reporting format 910 is used repetitively in each reporting interval. Thus, report x, for $x = 1, \ldots, L$, is sent in the same location of the control channel in each reporting interval.

Figure 10:
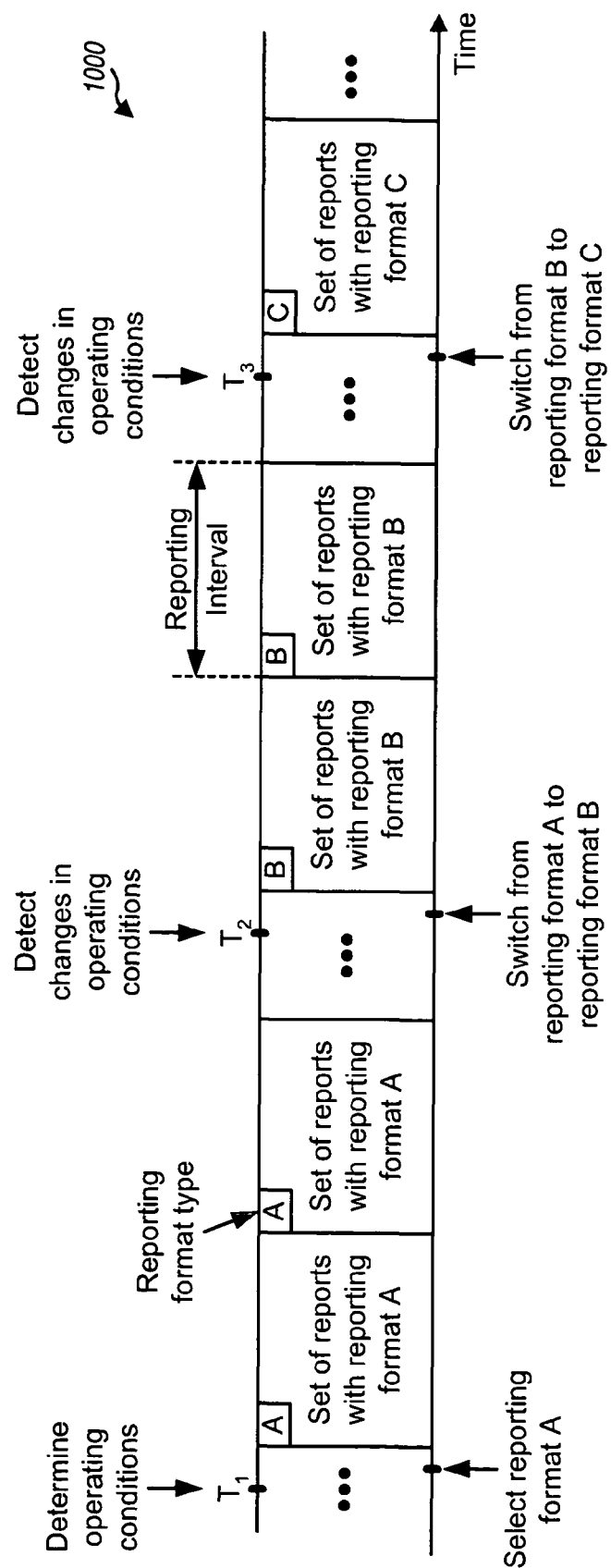
FIG. 10 shows a report transmission scheme with selectable reporting formats.

FIG. 10 shows an embodiment of a report transmission scheme 1000 for a control channel with selectable reporting formats. Initially, at time $T_1$, the operating conditions of the terminal are determined. A reporting format A that is appropriate for the current operating conditions is selected for use. A set of reports is sent in each reporting interval using reporting format A. At time $T_2$, changes in the operating conditions are detected. A reporting format B that is more appropriate for the new operating conditions is selected for use. Thereafter, a set of reports is sent in each reporting interval using reporting format B. At time $T_3$, changes in the operating conditions are again detected. A reporting format C that is more appropriate for the new operating conditions is selected for use. Thereafter, a set of reports is sent in each reporting interval using reporting format C.

A switch in reporting format may be achieved in various manners. In an embodiment that is shown in FIG. 10, a reporting format includes a reporting format type field that identifies that reporting format. A set of reporting formats may be supported. The definition of each reporting format in the set may be known a priori by the terminal and the base station, conveyed via signaling during call setup or at switching time, sent via broadcast messages, and so on. A suitable reporting format may be dynamically selected in each reporting interval and identified by the reporting format type field. In another embodiment, a reporting format includes a field that indicates a reporting format to use in a subsequent reporting interval. In yet another embodiment, a change in reporting format is achieved by exchanging signaling between the terminal and the base station, e.g., through a traffic channel, which is different from the DCCH, using control messages.

In an embodiment, a terminal may autonomously select a reporting format. The terminal may determine its operating conditions (e.g., environment, capabilities, etc.) and may select a suitable reporting format based on its operating conditions. In another embodiment, a terminal and a base station may jointly select a reporting format. For example, the terminal may determine its operating conditions and suggest a reporting format, and the base station may accept or reject the suggested reporting format. In yet another embodiment, a base station may select a reporting format for a terminal, e.g., based on information provided by the terminal.

A terminal may use one reporting format until a new reporting format is selected, e.g., due to detected changes in operating conditions. The terminal may also use multiple reporting formats in a predetermined manner. For example, the terminal may alternate between two reporting formats A and B, use reporting format A in odd reporting intervals, and use reporting format B in even reporting intervals. Reporting format 600 in FIG. 6 may be considered as being composed of four smaller reporting formats—a first reporting format for superslots 0, 2, 4 and 6, a second reporting format for superslot 1 and 5, a third slot format for superslot 3, and a fourth slot format for superslot 7.

A terminal may have multiple connections with multiple base stations. The terminal may use the same reporting format for all base stations or may use different reporting formats for different base stations.

Each report may have any format/structure that is suitable for that report. A report may convey a single value or multiple values. In an embodiment, one or more look-up tables may be defined for each type of report. Each look-up table may map a computed value to a report value with a specific number of bits. As an example, for DL SNR, one look-up table may map a computed DL SNR value for a base station to a 5-bit value for a full DL SNR report for non-DL-macrodiversity, another look-up table may map the computed DL SNR value as well as whether the base station is preferred to a 5-bit value for a full DL SNR report for DL-macrodiversity, yet another look-up table may map a delta DL SNR value to a 3-bit value for a delta DL SNR report, and so on. Each look-up table may be defined to achieve good performance for the corresponding report. Table 3 shows an exemplary look-up table that maps a DL SNR value within a range of −13 dB to +29 dB to a 5-bit value for a full DL SNR report. Table 3 also shows an exemplary look-up table that maps a delta SNR value within a range of −5 dB to +5 dB to a 3-bit value for a delta DL SNR report. Other look-up tables may also be defined for the other types of report.

TABLE 3

| 5-bit DL SNR Report | | 3-bit DL SNR Rep | |
|---|---|---|---|
| Value | SNR | Value | delta SNR |
| 0 | −13 dB | 0 | −5 dB |
| 1 | −11 dB | 1 | −3 dB |
| 2 | −10 dB | 2 | −2 dB |
| 3 | −9 dB | 3 | −1 dB |
| 4 | −8 dB | 4 | 0 dB |
| 5 | −7 dB | 5 | 1 dB |
| 6 | −6 dB | 6 | 3 dB |
| 7 | −5 dB | 7 | 5 dB |
| 8 | −4 dB | | |
| 9 | −3 dB | | |
| 10 | −2 dB | | |
| 11 | −1 dB | | |
| 12 | 0 dB | | |
| 13 | 1 dB | | |
| 14 | 2 dB | | |
| 15 | 3 dB | | |
| 16 | 4 dB | | |
| 17 | 5 dB | | |
| 18 | 6 dB | | |
| 19 | 7 dB | | |
| 20 | 9 dB | | |
| 21 | 11 dB | | |
| 22 | 13 dB | | |
| 23 | 15 dB | | |
| 24 | 17 dB | | |
| 25 | 19 dB | | |
| 26 | 21 dB | | |
| 27 | 23 dB | | |
| 28 | 25 dB | | |
| 29 | 27 dB | | |
| 30 | 29 dB | | |
| 31 | Reserved | | |

In an embodiment, a single dictionary is used for each report type. A dictionary for a report type defines a specific format/structure for each report of that type. The dictionary defines how each report is interpreted. For example, a dictionary for DL SNR may have one format for a 5-bit DL SNR report for non-DL-macrodiversity, another format for a 5-bit DL SNR report for DL-macrodiversity, and yet another format for a 3-bit DL SNR report. The same dictionary, and hence the same three SNR report formats, may be used for all reporting formats having DL SNR reports.

In another embodiment, multiple dictionaries are used for a given report type. Each dictionary conveys a specific format/structure for each report of that type. Multiple SNR dictionaries may be used for SNR reports. For example, an SNR report for low mobility may use a different format than an SNR report for high mobility. Different look-up tables may be used for SNR reports for low and high mobility. As another example, an SNR report for good channel conditions may use a different format than an SNR report for poor channel conditions. The range of SNR values and/or the SNR step sizes may be different for different SNR report formats. Multiple request dictionaries may also be used for UL requests, e.g., for different QoS. Each request dictionary may provide certain backlog information (e.g., number of MAC frames and/or delay information) at the terminal and/or use different formats for the UL requests. For example, a 4-bit UL request may have different meanings in different request dictionaries. Multiple dictionaries may also be used for other types of report.

Referring back to FIG. 9, a report may carry a value that is within a range of values for that report. The report value may have different meanings in different dictionaries. Thus, the information conveyed in the report (i.e., actual meaning of the report value) is determined by both the report value and the dictionary used for the report.

The specific dictionary to use for each report may be conveyed explicitly or implicitly. In an embodiment, each reporting format uses a specific dictionary for each report. In this embodiment, the dictionary for each report type is implicitly conveyed by the reporting format. For each reporting format selected for use, the terminal and the base station know a priori the specific dictionary to use for DL SNR reports, the specific dictionary to use for UL requests, and so on. The terminal and the base station can both properly interpret each report sent using the selected reporting format.

In another embodiment, a dictionary may be selected for each report type independently of the reporting format. For example, multiple request dictionaries may be available for a given reporting format. Different dictionaries may be selected for use in different operating scenarios (e.g., different mobility). An appropriate dictionary may be selected whenever changes in operation conditions are detected, e.g., in conjunction with or independent of the selection of reporting format. The selected dictionary may be conveyed via signaling or in some other manner.

The information bits for reports may be encoded, modulated, and processed in various manners. In an embodiment, the information bits to be sent in a DCCH segment are encoded (e.g., with a block code) to generate code bits. The code bits are then mapped to modulation symbols based on a modulation scheme. The modulation symbols are sent in the tone-symbols for the DCCH segment. In an embodiment, a sequence of scrambling bits is used to scramble the information bits or the code bits in some or all of the DCCH segments. For example, the scrambling sequence may be applied to some reports and not applied to some other reports. In an embodiment, the scrambling sequence is a function of the reporting format. In this embodiment, when the reporting format changes, the scrambling sequence also changes. The scrambling sequence may be used to detect state disconnect, which is a situation in which a terminal believes that it is using one reporting format while a base station believes that the terminal is using a different reporting format.

Figure 11:
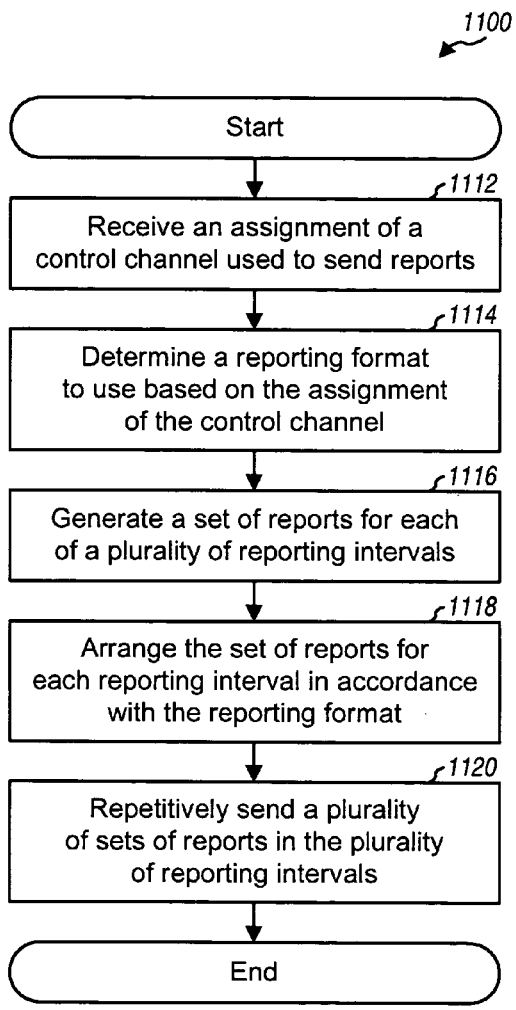
FIG. 11 shows a process to send reports repetitively.

FIG. 11 shows an embodiment of a process 1100 for sending reports repetitively. A terminal receives an assignment of a control channel (e.g., a DCCH) used to send reports (block 1112). The terminal determines a reporting format to use based on the assignment of the control channel (block 1114). For example, a first reporting format may be used for a full (e.g., full-tone) assignment of the control channel, and a second reporting format may be used for a partial (e.g., split-tone) assignment of the control channel. The first and second reporting formats may include different numbers of control channel segments in one reporting interval and/or different numbers of information bits in each control channel segment. The terminal generates a set of reports for each of a plurality of reporting intervals (block 11 16). The terminal arranges the set of reports for each reporting interval in accordance with the reporting format (block 1118). The terminal repetitively sends a plurality of sets of reports in the plurality of reporting intervals (block 1120).

The reporting format indicates a specific sequence of reports sent in specific locations of a control channel frame. A control channel frame is a unit of the control channel used to send one set of reports in accordance with the reporting format. The control channel frame may comprise multiple control channel segments, e.g., 40 DCCH segments. The reporting format may include one or more reports in each control channel segment.

The reporting format may include multiple types of report, e.g., for SNR, uplink request, available transmit power, interference, delay information, and so on, or a combination thereof. The reporting format may include any number of reports of each type, which may be determined based on the importance of the reports of that type. For example, reports for SNR and uplink request may be sent more often than reports of other types. The reporting format may include multiple reports of a particular type in different locations of the control channel frame, reports of different sizes for a given type, and so on.

The terminal may determine a dictionary to use for each report type from among at least one dictionary available for that report type. The dictionary for each report type defines the format/structure for each report of that type. The terminal may generate reports of each type in accordance with the dictionary applicable for that report type. Multiple dictionaries may be used for SNR reports, e.g., one dictionary for low mobility and another dictionary for high mobility. Multiple dictionaries may also be used for uplink request for different QoS traffics. Multiple dictionaries may also be defined for other report types.

Figure 12:
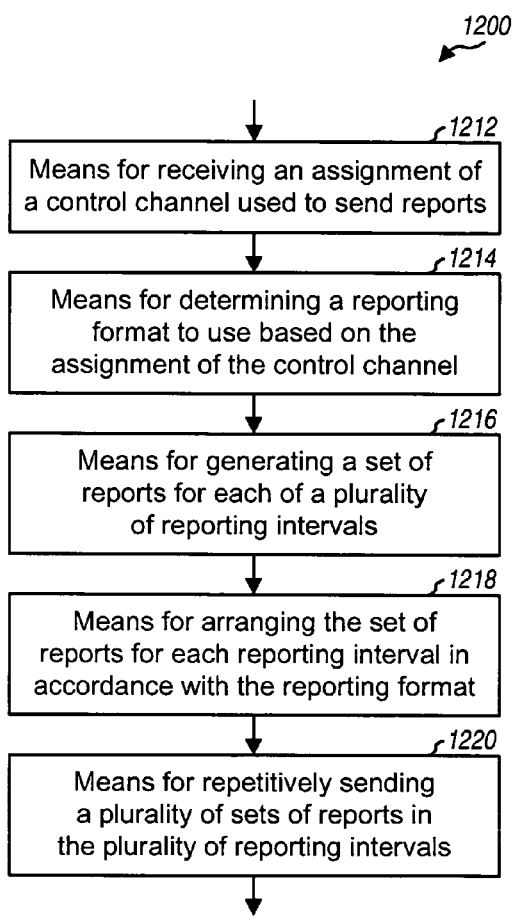
FIG. 12 shows an apparatus to send reports repetitively.

FIG. 12 shows an embodiment of an apparatus 1200 for sending reports repetitively. Apparatus 1200 includes means for receiving an assignment of a control channel used to send reports (block 1212), means for determining a reporting format to use based on the assignment of the control channel (block 1214), means for generating a set of reports for each of a plurality of reporting intervals (block 1216), means for arranging the set of reports for each reporting interval in accordance with the reporting format (block 1218), and means for sending a plurality of sets of reports in the plurality of reporting intervals (block 1220).

FIG. 13 shows an embodiment of a process 1300 for sending reports adaptively based on operating conditions. A terminal sends reports in accordance with a first reporting format to a base station (block 1312). The first reporting format may be a default reporting format or may be selected based on the current operating conditions. An indication to use a second reporting format is obtained (block 1314). The base station may select the second reporting format and send signaling with the indication to the terminal. Alternatively, the terminal may select the second reporting format and generate the indication. The terminal thereafter sends reports in accordance with the second reporting format (block 1316).

For block 1314, changes in the operating conditions may be detected by the terminal and/or the base station, e.g., based on changes in the environment of the terminal, the capabilities of the terminal, the QoS of traffics for the terminal, and so on. The second reporting format may be selected based on the detected changes in the operating conditions. For example, changes in mobility of the terminal may be detected. The second reporting format may then be selected based on the detected changes in mobility. The first reporting format may be suitable for a first mobility condition (e.g., stationary or low speed) and the second reporting format may be suitable for a second mobility condition (e.g., high speed). Changes in QoS of traffics for the terminal may also be detected. The second reporting format may then be selected based on the detected changes in QoS. The first and second reporting formats may be designed for different QoS traffics.

Each reporting format may be associated with specific dictionaries. Alternatively, the dictionaries may be selected independently of the reporting format. In any case, the terminal determines the proper dictionary to use for each report in the current reporting format. The terminal generates reports of each type in accordance with the dictionary for that report type.

The change from the first reporting format to the second reporting format may be indicated by a field that indicates the reporting format type, e.g., as shown in FIG. 10. The change in reporting format may also be achieved by exchanging signaling with the base station.

FIG. 14 shows an embodiment of an apparatus 1400 for sending reports adaptively. Apparatus 1400 includes means for sending reports in accordance with a first reporting format to a base station (block 1412), means for obtaining an indication to use a second reporting format (block 1414), and means for sending reports in accordance with the second reporting format (block 1416).

The reporting techniques may be used for sending reports from a terminal to a base station on the uplink, as described above. The reporting techniques may also be used to send reports from a base station to a terminal on the downlink.

Figure 15:
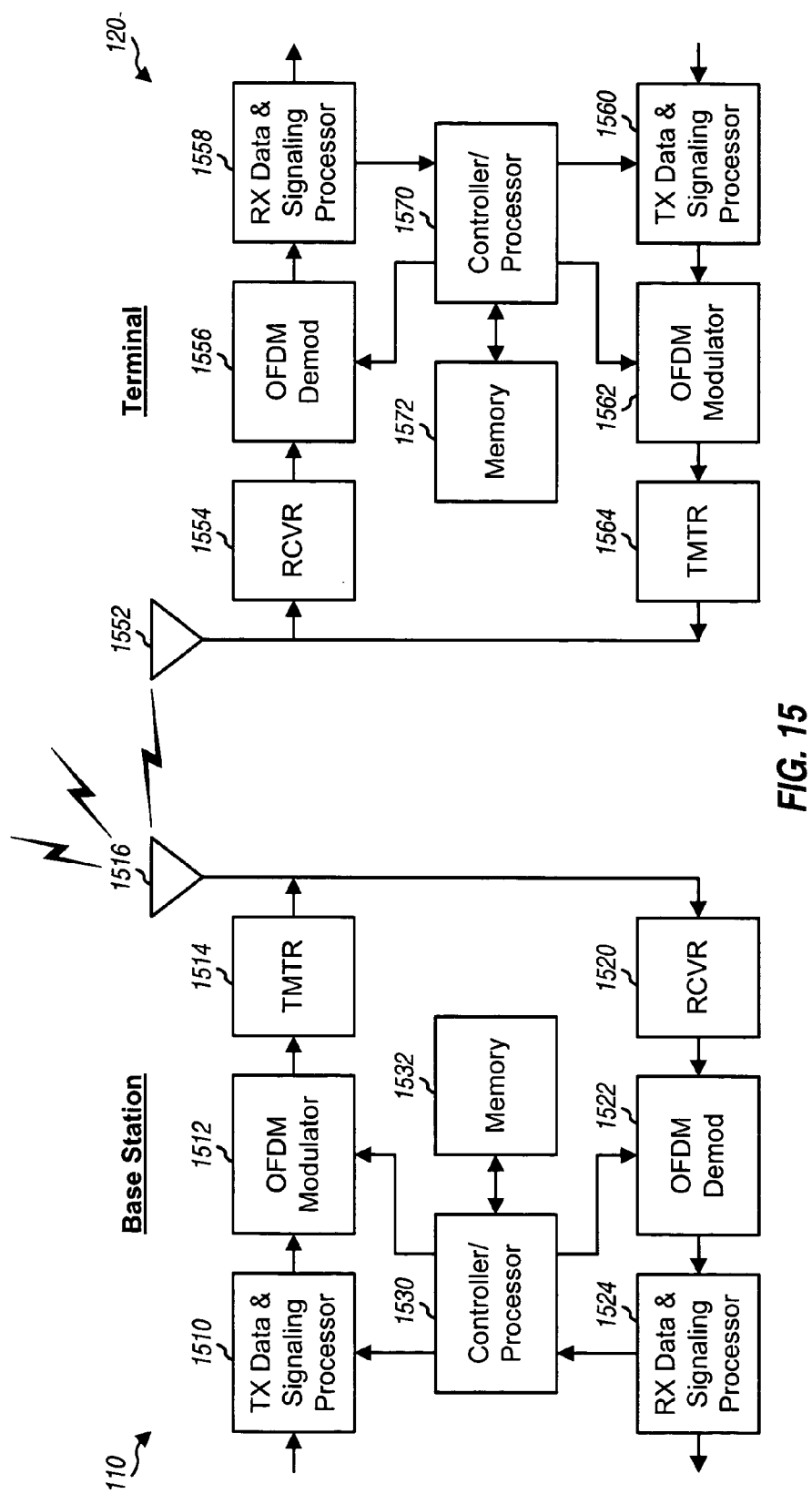
FIG. 15 shows a block diagram of a base station and a terminal.

FIG. 15 shows a block diagram of an embodiment of a base station 110 and a terminal 120 in FIG. 1. At base station 110, a transmit (TX) data and signaling processor 1510 receives traffic data for the terminals being served and signaling. Processor 1510 processes (e.g., formats, encodes, interleaves, and symbol maps) the traffic data, signaling, and pilot and provides output symbols. An OFDM modulator 1512 performs OFDM modulation on the output symbols and generates OFDM symbols. A transmitter (TMTR) 1514 conditions (e.g., converts to analog, filters, amplifies, and upconverts) the OFDM symbols to generate a downlink signal, which is transmitted via an antenna 1516.

At terminal 120, an antenna 1552 receives downlink signals from base station 110 and other base stations and provides a received signal to a receiver (RCVR) 1554. Receiver 1554 conditions and digitizes the received signal and provides samples. An OFDM demodulator (Demod) 1556 performs OFDM demodulation on the samples and provides frequency-domain symbols. A receive (RX) data and signaling processor 1558 processes (e.g., symbol demaps, deinterleaves, and decodes) the frequency-domain symbols and provides decoded data and signaling for terminal 120.

On the uplink, a controller/processor 1570 generates reports in accordance with the reporting format and dictionaries selected for use. A TX data and signaling processor 1560 generates output symbols for traffic data, signaling (e.g., reports), and pilot to be sent to base station 110. An OFDM modulator 1562 performs OFDM modulation on the output symbols and generates OFDM symbols. A transmitter 1564 conditions the OFDM symbols and generates an uplink signal, which is transmitted via antenna 1552.

At base station 110, the uplink signals from terminal 120 and other terminals are received by antenna 1516, conditioned and digitized by a receiver 1520, demodulated by an OFDM demodulator 1522, and processed by an RX data and signaling processor 1524 to recover the traffic data and signaling sent by terminal 120 and other terminals.

Controllers/processors 1530 and 1570 direct the operation of various processing units at base station 110 and terminal 120, respectively. Controller/ processor 1570 may perform process 1100 in FIG. 11, process 1300 in FIG. 13, and/or other processes to send reports on the uplink. Controller/ processor 1530 may receive reports from terminal 120 and other terminals and may schedule transmission on the downlink and/or uplink based on the reports received from the terminals. Memories 1532 and 1572 store program codes and data for base station 110 and terminal 120, respectively.

The reporting techniques described herein may be implemented by various means. For example, these techniques may be implemented in hardware, firmware, software, or a combination thereof. For a hardware implementation, the processing units at a terminal or a base station to support reporting may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the reporting techniques may be implemented with modules (e.g., procedures, functions, and so on) that perform the functions described herein. The firmware and/or software codes may be stored in a memory (e.g., memory 1532 or 1572 in FIG. 15) and executed by a processor (e.g., processor 1530 or 1570). The memory may be implemented within the processor or external to the processor.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. An apparatus for use in a wireless communication system, the apparatus comprising:
   at least one processor configured to:
   receive an assignment of a control channel used to send reports,
   determine a reporting format based on the assignment of the control channel, the reporting format containing little or no overhead information, wherein the reporting format comprises predetermined report parameters,
   generate a set of reports for each of a plurality of reporting intervals, wherein generating the set of reports comprises:
   determining a dictionary to use for a particular type of report from among multiple dictionaries available for the particular type, and
   generating reports of the particular type in accordance with the dictionary,
   scramble the set of reports for each of the plurality of reporting intervals with a scrambling sequence associated with the reporting format,
   arrange the set of reports for each of the plurality of reporting intervals in accordance with the reporting format, and
   send a plurality of sets of reports in the plurality of reporting intervals; and
   a memory coupled to the at least one processor.

2. The apparatus of claim 1, wherein the reporting format indicates a specific sequence of reports sent in specific locations of a control channel frame, wherein the control channel frame comprises multiple control channel segments, and wherein the reporting format includes at least one report in each of the multiple control channel segments.

3. The apparatus of claim 1, wherein the reporting format includes multiple types of report.

4. The apparatus of claim 1, wherein the dictionary defines a format for each report of the particular type.

5. The apparatus of claim 1, wherein the particular type of report is for signal-to-noise ratio (SNR), and wherein the multiple dictionaries comprise a first dictionary for low mobility and a second dictionary for high mobility.

6. The apparatus of claim 1, wherein the particular type of report is for uplink request, and wherein the multiple dictionaries are for different quality of service (QoS) traffics.

7. The apparatus of claim 1, wherein the at least one processor is configured to use a first reporting format as the reporting format if a full assignment is received for the control channel, and to use a second reporting format as the reporting format if a partial assignment is received for the control channel.

8. The apparatus of claim 7, wherein the first reporting format includes a first number of control channel segments in one reporting interval, and wherein the second reporting format includes a second number of control channel segments in one reporting interval.

9. The apparatus of claim 7, wherein the first reporting format includes a first number of information bits in each control channel segment, and wherein the second reporting format includes a second number of information bits in each control channel segment.

10. A method comprising operating a wireless communications device to perform the steps of:
    receiving an assignment of a control channel used to send reports;
    determining a reporting format based on the assignment of the control channel, the reporting format containing little or no overhead information, wherein the reporting format comprises predetermined report parameters;
    generating a set of reports for each of a plurality of reporting intervals, wherein the generating comprises:
    determining a dictionary to use for a particular type of report from among multiple dictionaries available for the particular type; and
    generating reports of the particular type in accordance with the dictionary;

scrambling the set of reports for each of the plurality of reporting intervals with a scrambling sequence associated with the reporting format;

arranging the set of reports for each of the plurality of reporting intervals in accordance with the reporting format; and sending a plurality of sets of reports in the plurality of reporting intervals.

11. An apparatus for use in a wireless communication system, the apparatus comprising:

means for receiving an assignment of a control channel used to send reports;

means for determining a reporting format based on the assignment of the control channel, the reporting format containing little or no overhead information, wherein the reporting format comprises predetermined report parameters;

means for generating a set of reports for each of a plurality of reporting intervals, wherein the means for generating is configured to:

determine a dictionary to use for a particular type of report from among multiple dictionaries available for the particular type; and generate reports of the particular type in accordance with the dictionary;

means for scrambling the set of reports for each of the plurality of reporting intervals with a scrambling sequence associated with the reporting format;

means for arranging the set of reports for each of the plurality of reporting intervals in accordance with the reporting format; and means for sending a plurality of sets of reports in the plurality of reporting intervals.

12. A non-transitory storage medium including instructions stored thereon, comprising:

a first instruction set for receiving an assignment of a control channel used to send reports from a wireless terminal;

a second instruction set for determining a reporting format based on the assignment of the control channel, the reporting format containing little or no overhead information, wherein the reporting format comprises predetermined report parameters;

a third instruction set for generating a set of reports for each of a plurality of reporting intervals, wherein the generating comprises:

determining a dictionary to use for a particular type of report from among multiple dictionaries available for the particular type; and generating reports of the particular type in accordance with the dictionary;

a fourth instruction set for scrambling the set of reports for each of the plurality of reporting intervals with a scrambling sequence associated with the reporting format;

a fifth instruction set for arranging the set of reports for each of the plurality of reporting intervals in accordance with the reporting format; and a sixth instruction set for directing transmission of a plurality of sets of reports in the plurality of reporting intervals.

13. The method of claim 10, wherein the dictionary defines a format for each report of the particular type.

* * * * *